US012282376B2

(12) United States Patent
Kono et al.

(10) Patent No.: US 12,282,376 B2
(45) Date of Patent: Apr. 22, 2025

(54) SYSTEMS, DEVICES, AND METHODS FOR ANIMATING ALWAYS ON DISPLAYS AT VARIABLE FRAME RATES

(71) Applicant: META PLATFORMS TECHNOLOGIES, LLC, Menlo Park, CA (US)

(72) Inventors: Michiaki Kono, New York, NY (US); Dalton Thorn Flanagan, New York, NY (US); Allan Velzy, Needham, MA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 17/548,157

(22) Filed: Dec. 10, 2021

(65) Prior Publication Data
US 2023/0068679 A1 Mar. 2, 2023

Related U.S. Application Data

(60) Provisional application No. 63/236,374, filed on Aug. 24, 2021.

(51) Int. Cl.
*G06F 1/00* (2006.01)
*G06F 1/16* (2006.01)
(Continued)

(52) U.S. Cl.
CPC .......... *G06F 1/3265* (2013.01); *G06F 1/163* (2013.01); *G06F 1/3221* (2013.01)

(58) Field of Classification Search
CPC ....... G06F 1/3265; G06F 1/3221; G06F 1/163
See application file for complete search history.

(56) References Cited

U.S. PATENT DOCUMENTS 10,032,430 B2 * 7/2018 Huang .................. G09G 5/00
2014/0191981 A1 * 7/2014 Ramasarma ........ H04M 1/0202
345/173
(Continued)

FOREIGN PATENT DOCUMENTS

EP 2786223 B1 10/2017

OTHER PUBLICATIONS

International Search report and Written Opinion for International Application No. PCT/US2022/041396, mailed Dec. 15, 2022, 11 pages.
(Continued)

*Primary Examiner* — Mohammed H Rehman
(74) *Attorney, Agent, or Firm* — Morgan, Lewis & Bockius LLP

(57) ABSTRACT

The disclosed computer-implemented method may include (1) transferring control of a display of a computing device from a high-power physical processor of the computing device to a low-power physical processor of the computing device, (2) animating, using the low-power physical processor, the display at a first frame rate during a first time period, (3) animating, using the low-power physical processor, the display at a second frame rate during a second time period, (4) transferring control of the display from the low-power physical processor to the high-power physical processor, and (5) animating, using the high-power physical processor, the display. Various other methods, systems, and computer-readable media are also disclosed.

19 Claims, 25 Drawing Sheets

(51) Int. Cl.
*G06F 1/3221* (2019.01)
*G06F 1/3234* (2019.01)

(56) References Cited

U.S. PATENT DOCUMENTS

| | | | | |
|---|---|---|---|---|
| 2015/0046676 A1* | 2/2015 | Archibald | ............. | G06F 9/5083 |
| | | | | 712/28 |
| 2015/0082255 A1* | 3/2015 | DeVries | ............... | G06F 3/0488 |
| | | | | 715/863 |
| 2015/0172539 A1* | 6/2015 | Neglur | ................... | H04N 23/90 |
| | | | | 348/222.1 |
| 2015/0187339 A1* | 7/2015 | Vaz Waddington | ... | G09G 5/393 |
| | | | | 345/563 |
| 2017/0088072 A1* | 3/2017 | Curtis | .................... | G08B 31/00 |
| 2018/0095522 A1 | 4/2018 | Huang et al. | | |
| 2018/0277057 A1* | 9/2018 | Yamada | ............... | G09G 3/3696 |
| 2019/0164518 A1 | 5/2019 | Dimitrov | | |
| 2020/0210673 A1* | 7/2020 | Krah | .................. | G06V 40/1318 |
| 2021/0034172 A1 | 2/2021 | Li | | |
| 2021/0109585 A1* | 4/2021 | Fleming | ................ | G06F 1/3231 |
| 2021/0142749 A1* | 5/2021 | Han | ..................... | G09G 3/3611 |
| 2021/0195115 A1* | 6/2021 | Tani | ................... | A61B 1/00036 |
| 2022/0011895 A1* | 1/2022 | Park | ...................... | G06F 3/0412 |

OTHER PUBLICATIONS

International Preliminary Report on Patentability for International Application No. PCT/US2022/041396, mailed Mar. 7, 2024, 10 pages.
Office Action mailed Jul. 31, 2024 for Taiwan Application No. 111128826, filed Aug. 1, 2022, 17 pages.

* cited by examiner

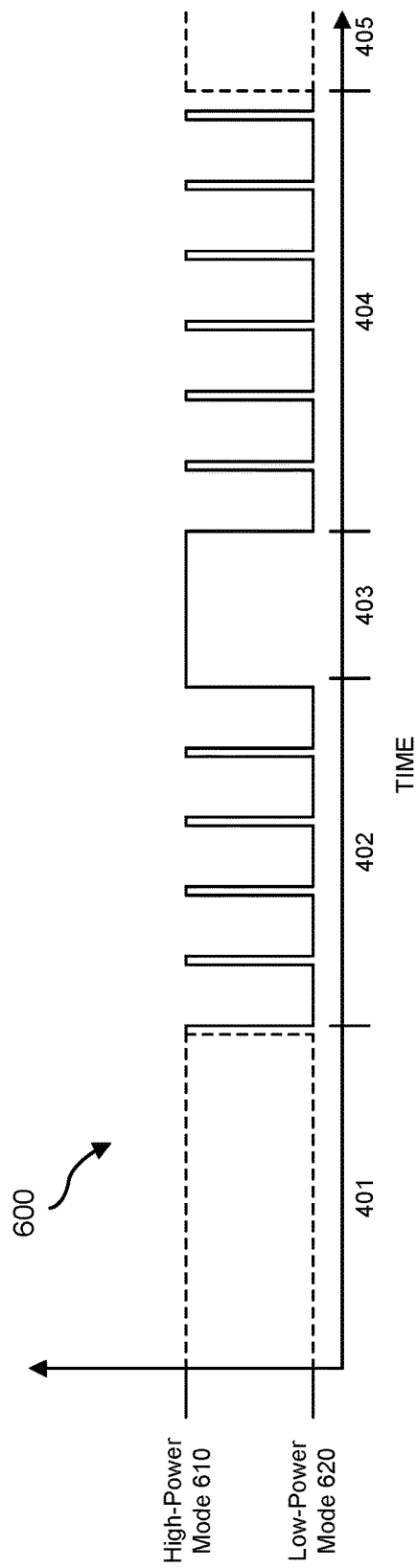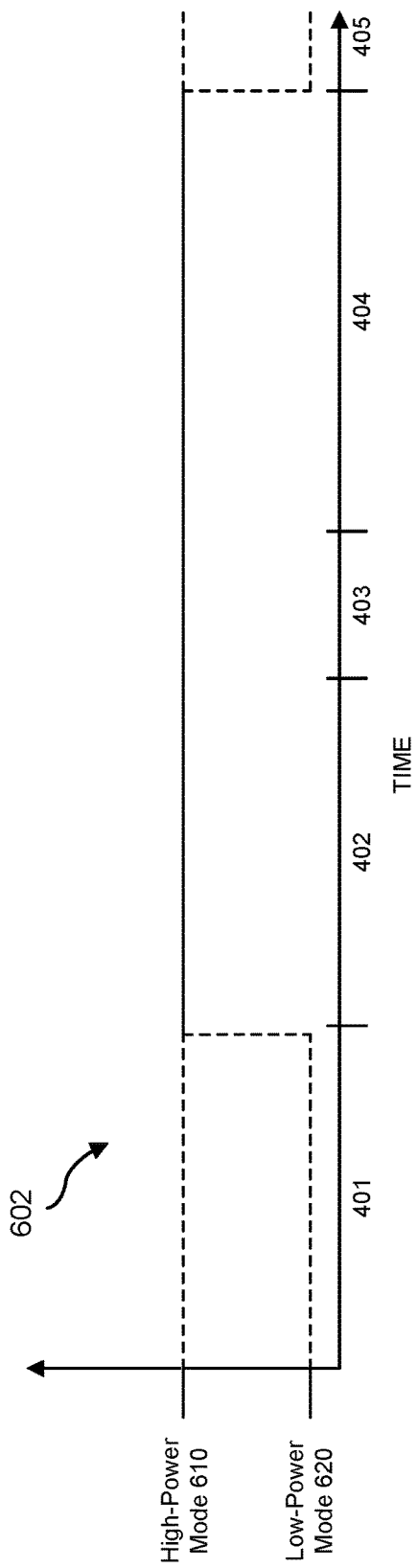

SYSTEMS, DEVICES, AND METHODS FOR ANIMATING ALWAYS ON DISPLAYS AT VARIABLE FRAME RATES

CROSS REFERENCE TO RELATED APPLICATION

This application claims the benefit of U.S. Provisional Application No. 63/236,374, filed 24 Aug. 2021, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 6A is a timeline of exemplary power-mode transitions of a low-power physical processor corresponding to the exemplary display animation of FIG. 4.

FIG. 6B is a timeline of additional exemplary power-mode transitions of a low-power physical processor corresponding to the exemplary display animation of FIG. 4.

Figure 1:
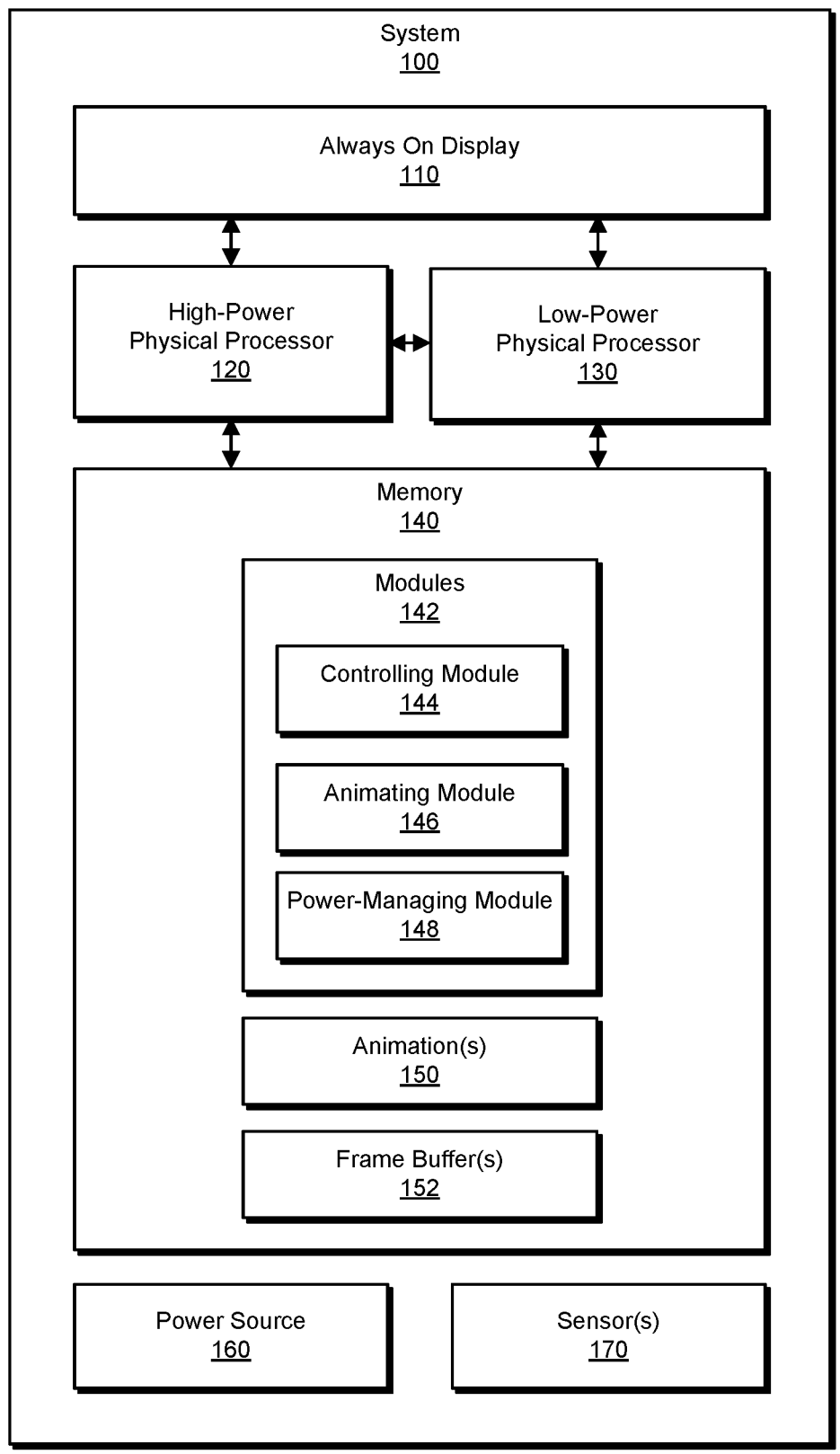
FIG. 1 is a block diagram of an exemplary system for animating always on displays.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Display technologies of conventional mobile devices (e.g., wearable devices and/or embedded devices powered by batteries) have typically consumed a large portion of the devices' power budgets when in operation. One technique often used to mitigate this issue has been to turn off the devices' displays when users are not actively interacting with the devices and to turn on the devices' displays when users again interact with the devices. With some types of mobile devices, users may expect or wish for certain information to be always available. For example, users of smartwatches may expect the smartwatches to always display the time. Unfortunately, many conventional smartwatches turn off their displays when not actively in use, which may render them useless for their primary purpose. While these smartwatches may turn on their displays in response to a user interaction (e.g., a screen tap), some users may find it burdensome to have to actively interact with their smartwatches in this way to see something as simple as the time.

Newer mobile devices have begun to include Always On Displays (AODs) to make information always available to their users. However, in an attempt to reduce power consumption, these newer devices typically do not animate their AODs unless users are actively interacting with them. Accordingly, the instant disclosure identifies and addresses a need for additional and improved systems and methods for efficiently animating always on displays, especially at frame rates that enable users to perceive smooth motions of displayed elements.

The present disclosure is generally directed to displaying animations at variable frame rates. As will be explained in greater detail below, embodiments of the present disclosure may use two physical processors (a low-power physical processor and a high-power physical processor) to control how animations are presented via an AOD. In some embodiments, each of the physical processors may have multiple power modes (e.g., an awake mode and a sleep mode). When a user is not interacting with the device, the high-power physical processor may transition to its sleep mode, and the low-power physical processor may be responsible for controlling the AOD. The low-power physical processor may variably transition from its sleep mode to its awake mode in order to drive frames to the AOD. In some embodiments, the low-power physical processor may run high-frame-rate animations in short bursts between longer periods of low-frame-rate animations. For example, the low-power physical processor may drive 10 frames over 1 second (i.e., a rough animation whose elements may be perceived as in motion) then no frames for 20 seconds (i.e., a static image). When necessary, the low-power physical processor may hand control of the AOD back to the high-power physical processor for other high-power activities (e.g., checking email, making a call, etc.). If an animation is occurring during the handoff, control of the animation may be seamlessly transitioned between the low-power physical processor and the high-power physical processor.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 2:
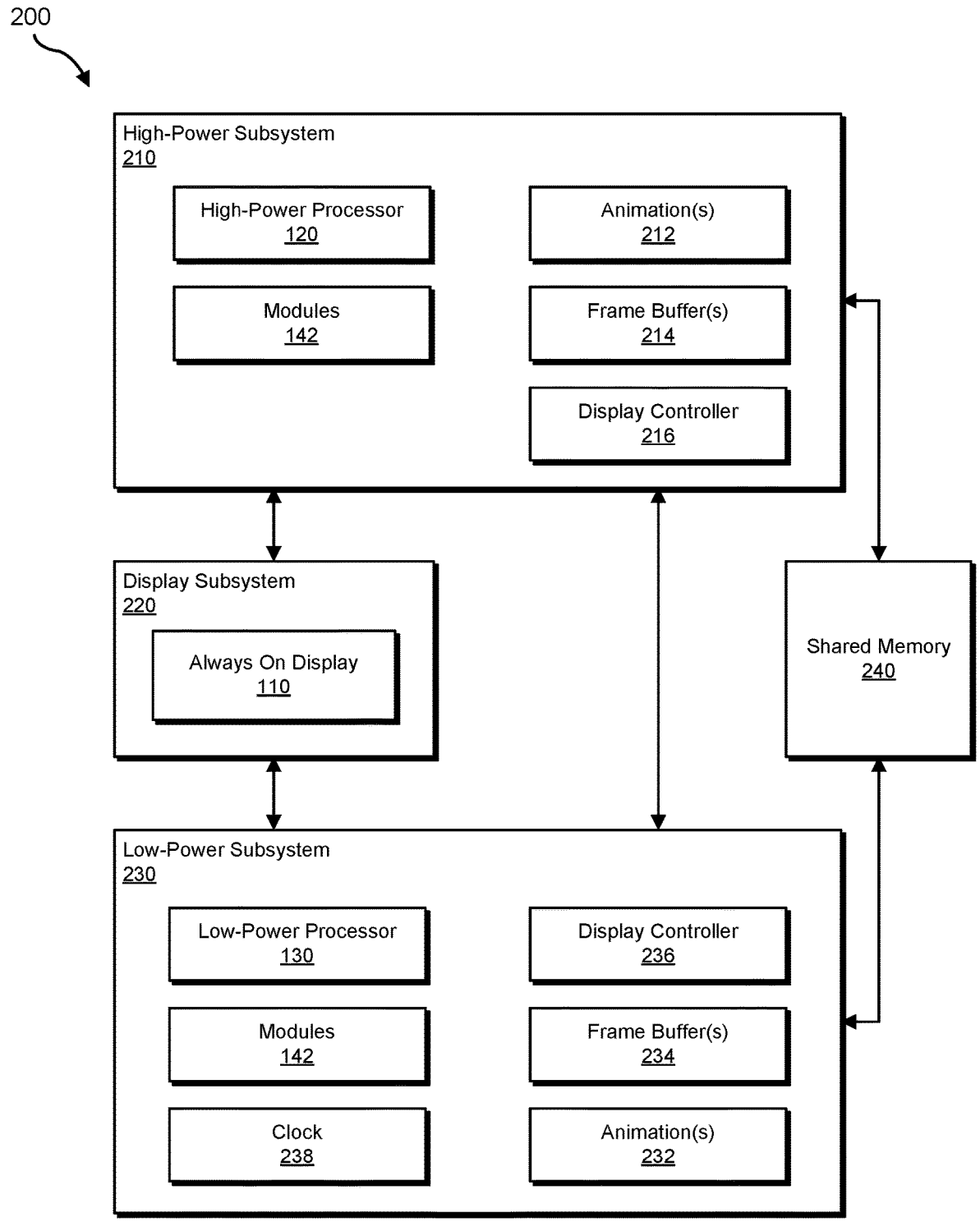
FIG. 2 is a block diagram of another exemplary system for animating always on displays.
Figure 3:
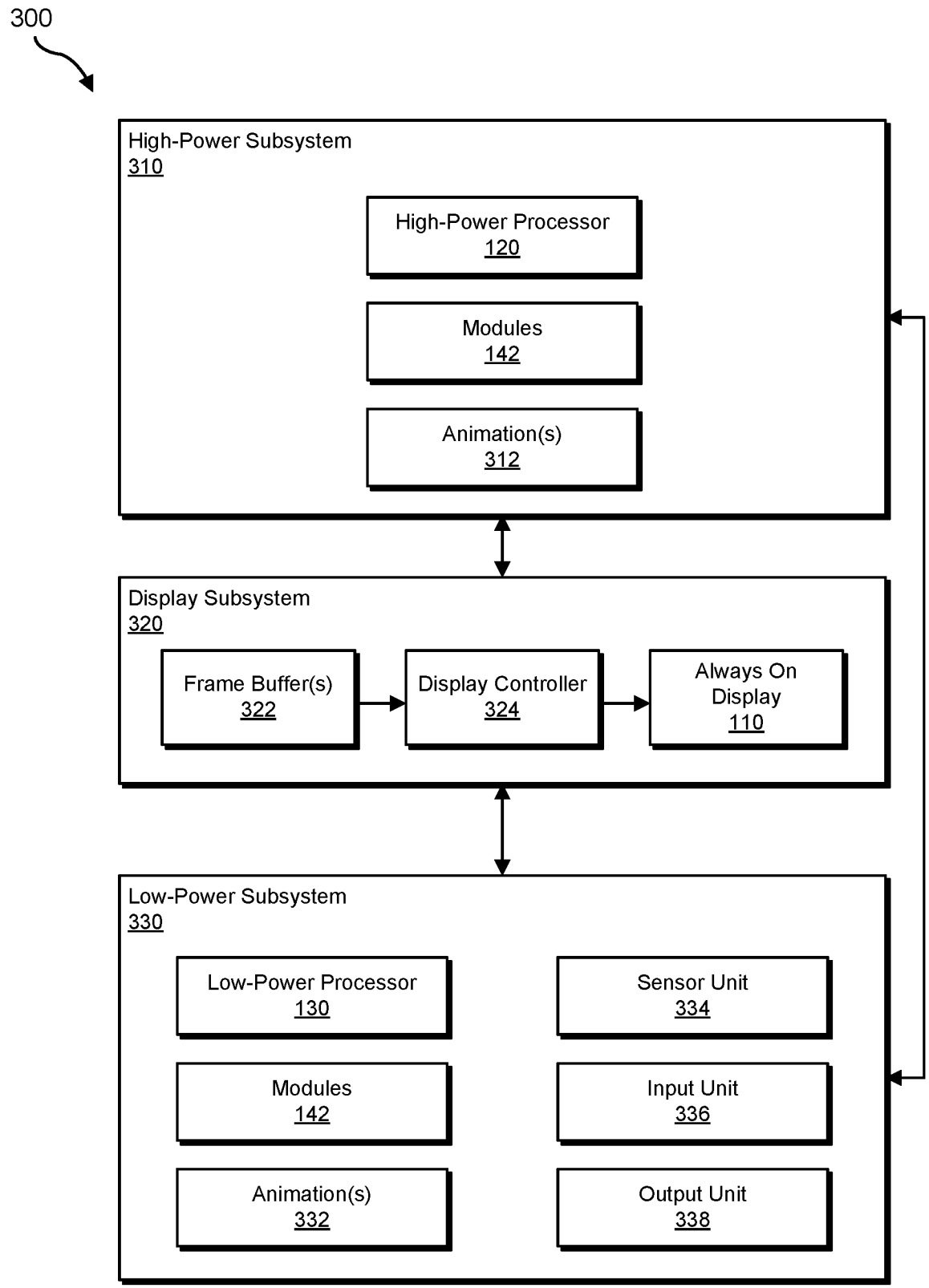
FIG. 3 is a block diagram of another exemplary system for animating always on displays.

The following will provide, with reference to FIGS. 1-3 detailed descriptions of systems for animating an always on display at variable frame rates. Detailed descriptions of corresponding timelines and computer-implemented methods will also be provided in connection with FIGS. 4-19. Finally, with reference to FIGS. 20-23B, the following will provide detailed descriptions of various wearable and/or artificial-reality systems and components that may implement embodiments of the present disclosure.

FIG. 1 is a block diagram of an example system 100 for animating an always on display 110 using two or more physical processors. Always on display 110 may represent or include any display technology capable of presenting animations and/or other types and forms of dynamic visual information. In some embodiments, always on display 110 may represent or include a low-power display screen capable of continuous and/or substantially continuous display and/or illumination. Examples of always on display 100 may include liquid crystal displays (LCDs), Super-Twisted Nematic (STN) LCDs, Thin-Film-Transistor (TFT) LCDs, Multi-domain Vertical Alignment (MVA) TFTs, organic light-emitting diode (OLED) displays, Passive Matrix Organic Light-Emitting Diode (PMOLED) displays, Active-Matrix Organic Light-Emitting Diode (AMOLED) displays, variations or combinations of one or more of the same, or any other type or form of display device.

As shown in FIG. 1, system 100 may include one or more high-power physical processors (e.g., a high-power physical processor 120) and one or more low-power physical processors (e.g., a low-power physical processor 130) capable of animating always on display 110 (e.g., driving frames of an animation to always on display 110). High-power physical processor 120 and/or low-power physical processor 130 generally represent any type or form of hardware-implemented processing unit capable of interpreting and/or executing computer-readable instructions.

In some embodiments, high-power physical processor 120 may represent a primary or application physical processor of system 100. High-power physical processor 120 may perform one or more primary functions of system 100 (e.g., functions relating to a user's direct interactions with system 100). In some embodiments, low-power physical processor may represent a secondary or auxiliary physical processor of system 100. Low-power physical processor 130 may perform one or more secondary functions of system 100. In some examples, low-power physical processor may perform computations for high-power physical processor 120. In other examples, low-power physical processor 130 may manage one or more Input/Output (I/O) operations. For example, low-power physical processor 130 may record measurements received from one or more connected sensors, receive data from one or more connected input devices, and/or transmit data over one or more connected output devices. In at least one embodiment, low-power physical processor 130 may represent a processing unit of a sensor hub.

Examples of high-power physical processor 120 and/or low-power physical processor 130 include, without limitation, microprocessors, microcontrollers, central processing units (CPUs), Graphics Processing Units (GPUs), Field-Programmable Gate Arrays (FPGAs), Application-Specific Integrated Circuits (ASICs), portions of one or more of the same, variations or combinations of one or more of the same, or any other suitable physical processor. In some embodiments, high-power physical processor 120 and low-power physical processor 130 may be included in a single monolithic die (e.g., as a System on a Chip (SoC)) or a single monolithic IC package (e.g., as a System in a Package (SiP), a Multi-Chip Module (MCM), or a Three-Dimensional Integrated Circuit (3D IC)). In other embodiments, high-power physical processor 120 and low-power physical processor 130 may be located in different dies or IC packages.

In some embodiments, high-power physical processor 120 and/or low-power physical processor 130 may have various states of operation (e.g., power modes), each consuming different amounts of power. For example, high-power physical processor 120 and/or low-power physical processor 130 may have (1) an operating state or an awake state in which high-power physical processor 120 and/or low-power physical processor 130 are fully operational and/or consume power at a maximum level, (2) a halt or sleep state in which high-power physical processor 120 and/or low-power physical processor 130 do not execute instructions and/or consume power at a minimum level, and/or (3) one or more intermediate states in which high-power physical processor 120 and/or low-power physical processor 130 execute instructions (e.g., at a reduced frequency) and/or consume power at an intermediate level.

The disclosed systems may choose to animate always on display 110 at a frame rate using whichever of high-power physical processor 120 or low-power physical processor 130 is able to animate always on display 110 at the frame rate. In some embodiments, the disclosed systems may choose to animate always on display 110 at a frame rate using a state of operation of high-power physical processor 120 or low-power physical processor 130 that consumes the least amount of energy and is still able to animate always on display 110 at that frame rate.

In some embodiments, the disclosed systems may use high-power physical processor 120 to animate always on display 110 at relatively higher frame rates (e.g., frame rates at which low-power physical processor 130 is unable to animate always on display 110) and may use low-power physical processor 130 to animate always on display 110 at relatively lower frame rates (e.g., frame rates at which low-power physical processor 130 is able to animate always on display 110). Additionally or alternatively, the disclosed systems may use high-power physical processor 120 to animate always on display 110 whenever high-power physical processor 120 is in its operating state and may use low-power physical processor 130 to animate always on display 110 whenever high-power physical processor 120 is in its sleep state. In at least one embodiment, the disclosed systems may use low-power physical processor 130 to animate always on display 110 when high-power physical processor 120 would consume more power to animate always on display 110.

As illustrated in FIG. 1, system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 142 and/or one or more animation(s) 150. In at least one embodiment, one or more portions of memory 140 may be designated as frame buffer(s) 152 for storing animation frames for immediate display to always on display 110. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some embodiments, system 100 may also include one or more modules 142 for performing one or more tasks. Modules 142 may include a controlling module 144 that manages how control of always on display 110 is transferred and/or transitioned between high-power physical processor 120 and low-power physical processor 130. Modules 142 may also include an animating module 146 that animates always on display 110 at variable frame rates (e.g., by writing animation frames to frame buffer(s) 152). Modules 142 may further include a power-managing module 148 for managing the operational states and/or power modes of high-power physical processor 120 and/or low-power physical processor 130. In one example, high-power physical processor 120 and/or low-power physical processor 130 may access and/or modify one or more of modules 142 and/or animation(s) 150 stored in memory 140. Additionally or alternatively, high-power physical processor 120 and/or low-power physical processor 130 may execute one or more of modules 142 to facilitate the animation of always on display 110 at variable frame rates.

As illustrated in FIG. 1, system 100 may include one or more animation(s) 150 for display via always on display 110. In some examples, animation(s) 150 may include one or more high-frame-rate animations (e.g., animations conveying smooth motion) and/or one or more low-frame-rate animations (e.g., animations conveying little to no motion). In some examples, high-frame-rate animations may include any type or form of animation having multiple frames that when displayed to a viewer at a sufficiently high frame rate enable the viewer to perceive movement of the elements contained therein. In some examples, low-frame-rate animations may include any type or form of animation having one or more frames that contain elements that appear static when presented to a viewer. In some examples, high-frame-rate animations may include any type or form of animation that is displayed above 10 frames per second, and/or low-frame-rate animations may include any type or form of animation that is displayed below 10 frames per second. In some examples, animation(s) 150 may include one or more high-frame-rate animations for presentation via a display screen of a smartwatch. For example, animation(s) 150 may include high-frame-rate animations designed and/or configured for presentation via a display screen of a smartwatch when an hour, a minute, or a second indicator rolls over. Additionally or alternatively, animation(s) 150 may include one or more low-frame-rate animations for presentation via a display screen of a smartwatch. For example, animation(s) 150 may include low-frame-rate animations designed and/or configured for presentation via a display screen of a smartwatch when an hour, a minute, or a second indicator rolls over.

In some examples, one or more of animation(s) 150 may be designed or configured to be displayed via always on display 110 at one or more low frame rates in a range of from 1 frame per 30 minutes to 1 frame per 25 minutes, or in a range of from 1 frame per 25 minutes to 1 frame per 20 minutes, or in a range of from 1 frame per 20 minutes to 1 frame per 15 minutes, or in a range of from 1 frame per 15 minutes to 1 frame per 10 minutes, or in a range of from 1 frame per 10 minutes to 1 frame per 5 minutes, or in a range of from 1 frame per 5 minutes to 1 frame per minute (fpm), or in a range of from 1 fpm to 2 fpm, or in a range of from 2 fpm to 4 fpm, or in a range of from 4 fpm to 6 fpm, or in a range of from 6 fpm to 8 fpm, or in a range of from 8 fpm to 10 fpm, or in a range of from 10 fpm to 20 fpm, or in a range of from 20 fpm to 30 fpm, or in a range of from 30 fpm to 40 fpm, or in a range of from 40 fpm to 50 fpm, or in a range of from 50 fpm to 60 fpm, or in a range of from 1 frame per second (fps) to 3 fps, or in a range of from 3 fps to 6 fps, or in a range of from 6 fps to 9 fps. In some examples, one or more of animation(s) 150 may be designed or configured to be displayed via always on display 110 at one or more high frame rates in a range of from 9 fps to 12 fps, or in a range of from 12 fps to 15 fps, or in a range of from 15 fps to 18 fps, or in a range of from 18 fps to 21 fps, or in a range of from 21 fps to 24 fps, or in a range of from 24 fps to 27 fps, or in a range of from 27 fps to 30 fps, or in a range of from 30 fps to 40 fps, or in a range of from 40 fps to 50 fps, or in a range of from 50 fps to 60 fps.

As illustrated in FIG. 1, system 100 may also include one or more power sources (e.g., power source 160) capable powering to the components of system 100. Power source 160 may include, without limitation, lithium-ion batteries, lithium-polymer batteries, primary lithium batteries, alkaline batteries, or any other form of power storage. In some cases, power source 160 may be a wired power source. In some embodiments, system 100 may also include one or more sensors 170. Examples of sensors 170 include, without limitation, touch sensors, image sensors, proximity sensors, biometric sensors, inertial measurement units, biosensors, heart-rate sensors, saturated-oxygen sensor, neuromuscular sensors, altimeter sensors, temperature sensors, bioimpedance sensors, pedometer sensors, optical sensors, sweat sensors, variations or combinations of one or more of the same, or any other type or form of sensing hardware or software.

System 100 in FIG. 1 may be implemented in a variety of ways. For example, all or a portion of system 100 may represent portions of an example system 200 ("system 200") in FIG. 2. As shown in FIG. 2, system 200 may include a high-power subsystem 210, a display subsystem 220, a low-power subsystem 230, and/or a shared memory 240. In this example, high-power subsystem 210 may include high-power physical processor 120 and one or more of modules 142, display subsystem 220 may include always on display 110, and low-power subsystem 230 may include low-power physical processor 130 and one or more of modules 142. As shown, high-power subsystem 210 and low-power subsystem 230 may be communicatively coupled to each other and/or to display subsystem 220. In some examples, high-power subsystem 210 and low-power subsystem 230 may each have read and/or write access to shared memory 240. In at least one example, high-power physical processor 120 and/or low-power physical processor 130 may write a portion of an animation (e.g., an icon image) to shared memory 240 for later retrieval (e.g., for the purpose of rendering a frame of the animation).

In some embodiments, high-power subsystem 210 may include or generate one or more animation(s) 212 for presentation via always on display 110. In some embodiments, high-power physical processor 120 may read some or all of animation(s) 212 from memory (e.g., shared memory 240) and/or may create some or all of animation(s) 212 on the fly. In some embodiments, high-power physical processor 120 may animate always on display 110 by transmitting frames of animation(s) 212 directly to display subsystem 220 for display to always on display 110. Additionally or alternatively, high-power physical processor 120 may animate always on display 110 by writing frames of animation(s) 212 to one or more frame buffer(s) 214 and/or shared memory 240 accessible to and/or monitored by a display controller 216. In some embodiments, display controller 216 may be configured to transmit frames written to frame buffer(s) 214 and/or shared memory 240 directly to display subsystem 220 for display to always on display 110.

In some embodiments, low-power subsystem 230 may include or generate one or more animation(s) 232 for presentation via always on display 110. In some embodiments, low-power physical processor 130 may read some or all of animation(s) 232 from memory (e.g., shared memory 240) and/or may create some or all of animation(s) 232 on the fly. In some embodiments, low-power physical processor 130 may animate always on display 110 by transmitting frames of animation(s) 232 directly to display subsystem 220 for display to always on display 110. Additionally or alternatively, low-power physical processor 130 may animate always on display 110 by writing frames of animation(s) 232 to one or more frame buffer(s) 234 and/or shared memory 240 accessible to and/or monitored by a display controller 236. In some embodiments, display controller 236 may be configured to transmit frames written to frame buffer(s) 234 and/or shared memory 240 directly to display subsystem 220 for display to always on display 110. In at least one embodiment, low-power physical processor 130 may animate always on display 110 by writing frames of animation(s) 212 or animation(s) 232 to frame buffer(s) 214 of high-power subsystem 210 and/or shared memory 240, and display controller 216 may be configured to transmit frames written to frame buffer(s) 214 and/or shared memory 240 by low-power physical processor 130 directly to display subsystem 220 for display to always on display 110. In another embodiment, low-power physical processor 130 may animate always on display 110 with frames of animation(s) 212 accessed or transmitted from high-power subsystem 210.

In some examples, animation(s) 232 may include one or more high-frame-rate animations (e.g., animations conveying smooth motion) and/or one or more low-frame-rate animations (e.g., animations conveying little to no motion). In some examples, animation(s) 232 may include one or more high-frame-rate animations designated for presentation via always on display 110 in response to events and/or conditions associated with a clock 238 (e.g., an expiration of a timer associated with clock 238).

FIG. 3 illustrates another way in which system 100 in FIG. 1 may be implemented. As shown, all or a portion of system 100 may represent portions of an example system 300 ("system 300") in FIG. 3. In this example, system 300 may include a high-power subsystem 310, a display subsystem 320, and a low-power subsystem 330. In this example, high-power subsystem 310 may include high-power physical processor 120 and one or more of modules 142, display subsystem 320 may include always on display 110, one or more frame buffer(s) 322, and a display controller 324, and low-power subsystem 330 may include low-power physical processor 130, one or more of modules 142, a sensor unit 334, an input unit 336, and an output unit 338. As shown, high-power subsystem 310 and low-power subsystem 330 may be communicatively coupled to each other and/or to display subsystem 320. In some examples, high-power subsystem 310, low-power subsystem 330, and/or display subsystem 320 may have read and/or write access to a shared memory (e.g., shared memory 240 in FIG. 2) from and/or to which portions of animations may be read or written as part of animating always on display 110.

In some embodiments, high-power subsystem 310 may include or generate one or more animation(s) 312 for presentation via always on display 110. In some embodiments, high-power physical processor 120 may read some or all of animation(s) 312 from memory and/or may create some or all of animation(s) 312 on the fly. In some embodiments, high-power physical processor 120 may animate always on display 110 by writing frames of animation(s) 312 to frame buffer(s) 322 accessible to and/or monitored by display controller 324 of display subsystem 320. In some embodiments, display controller 324 may read frames written to frame buffer(s) 322 by high-power physical processor 120 and relay the frames to always on display 110 for display.

In some embodiments, low-power subsystem 330 may include or generate one or more animation(s) 332 for presentation via always on display 110. In some embodiments, low-power physical processor 130 may read some or all of animation(s) 332 from memory and/or may create some or all of animation(s) 332 on the fly. In some embodiments, low-power physical processor 130 may animate always on display 110 by writing frames of animation(s) 332 to frame buffer(s) 322 of display subsystem 320. In some embodiments, display controller 324 may read frames written to frame buffer(s) 322 by low-power physical processor 130 and send the frames to always on display 110 for display. In at least one embodiment, low-power physical processor 130 may animate always on display 110 with frames of animation(s) 312 accessed or transmitted from high-power subsystem 310.

In some examples, animation(s) 332 may include one or more high-frame-rate animations (e.g., animations conveying smooth motion) and/or one or more low-frame-rate animations (e.g., animations conveying little to no motion). In some examples, animation(s) 332 may include one or more high-frame-rate animations designated for presentation via always on display 110 in response to events and/or conditions associated with sensor unit 334, input unit 336, and/or output unit 338.

Figure 4:
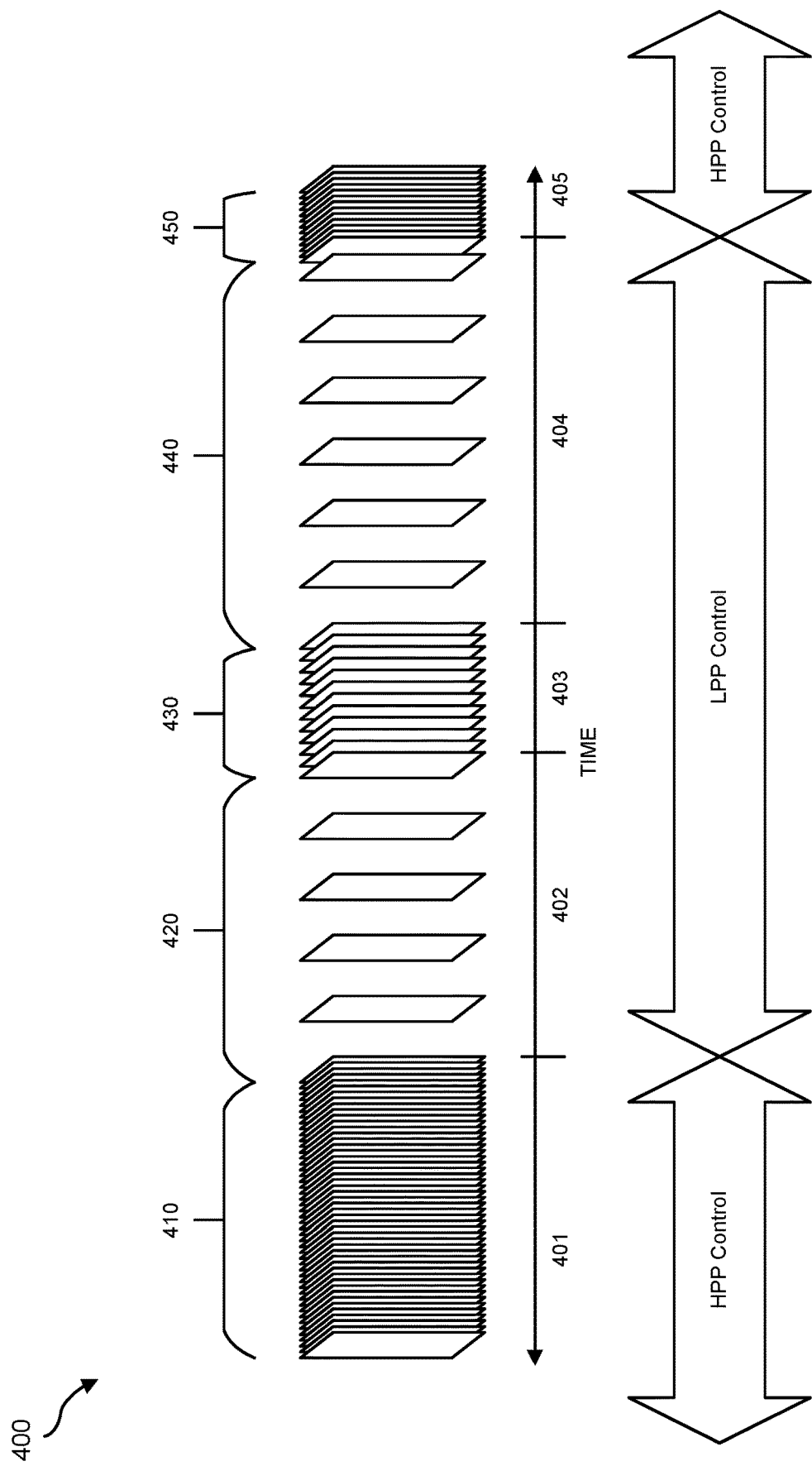
FIG. 4 is a timeline of exemplary display animations having variable frame rates.

FIG. 4 illustrates an exemplary animation timeline 400 of always on display 110 having consecutive time periods 401, 402, 403, 404, and 405. In this example, high-power physical processor 120 may initially control always on display 110 and may animate always on display 110 with frames 410 during time period 401. After control of always on display 110 is transferred from high-power physical processor 120 to low-power physical processor 130, low-power physical processor 130 may animate always on display 110 with frames 420, 430, and 440 during time periods 402, 403, and 404, respectively. After control of always on display 110 is transferred from low-power physical processor 130 back to high-power physical processor 120, high-power physical processor 120 may animate always on display 110 with frames 450 during time period 405. In this example, low-power physical processor 130 may display frames 430 at a higher frame rate than the frame rate at which frames 420 and 440 are displayed, and high-power physical processor 120 may display frames 410 and/or frames 450 at a higher frame rate than the frame rates at which frames 420, 430, and 440 are displayed. In some embodiments, low-power physical processor 130 may display frames 430 at a sufficiently high frame rate (e.g., greater than 10 frames per second) to cause elements contained in frames 430 to be perceived as in motion and/or display frames 420 and/or 440 at a lower frame rate to cause elements contained in frames 420 and 440 to be perceived as static and/or unmoving.

In some examples, high-power physical processor 120 may display frames 410 and/or 450 at one or more high frame rates in a range of from 30 fps to 60 fps, or in a range of from 60 fps to 90 fps, or in a range of from 90 fps to 120 fps, or in a range of from 120 fps to 150 fps, or in a range of from 150 fps to 180 fps, or in a range of from 180 fps to 210 fps, or in a range of from 210 fps to 240 fps. In some examples, low-power physical processor 130 may display frames 420 and/or 440 at one or more low frame rates in a range of from 1 frame per 30 minutes to 1 frame per 25 minutes, or in a range of from 1 frame per 25 minutes to 1 frame per 20 minutes, or in a range of from 1 frame per 20 minutes to 1 frame per 15 minutes, or in a range of from 1 frame per 15 minutes to 1 frame per 10 minutes, or in a range of from 1 frame per 10 minutes to 1 frame per 5 minutes, or in a range of from 1 frame per 5 minutes to 1 fpm, or in a range of from 1 fpm to 2 fpm, or in a range of from 2 fpm to 4 fpm, or in a range of from 4 fpm to 6 fpm, or in a range of from 6 fpm to 8 fpm, or in a range of from 8 fpm to 10 fpm, or in a range of from 10 fpm to 20 fpm, or in a range of from 20 fpm to 30 fpm, or in a range of from 30 fpm to 40 fpm, or in a range of from 40 fpm to 50 fpm, or in a range of from 50 fpm to 60 fpm, or in a range of from 1 fps to 3 fps, or in a range of from 3 fps to 6 fps, or in a range of from 6 fps to 9 fps. In some examples, low-power physical processor 130 may display frames 430 at one or more intermediate frame rates in a range of from 9 fps to 12 fps, or in a range of from 12 fps to 15 fps, or in a range of from 15 fps to 18 fps, or in a range of from 18 fps to 21 fps, or in a range of from 21 fps to 24 fps, or in a range of from 24 fps to 27 fps, or in a range of from 27 fps to 30 fps, or in a range of from 30 fps to 40 fps, or in a range of from 40 fps to 50 fps, or in a range of from 50 fps to 60 fps.

Figure 5:
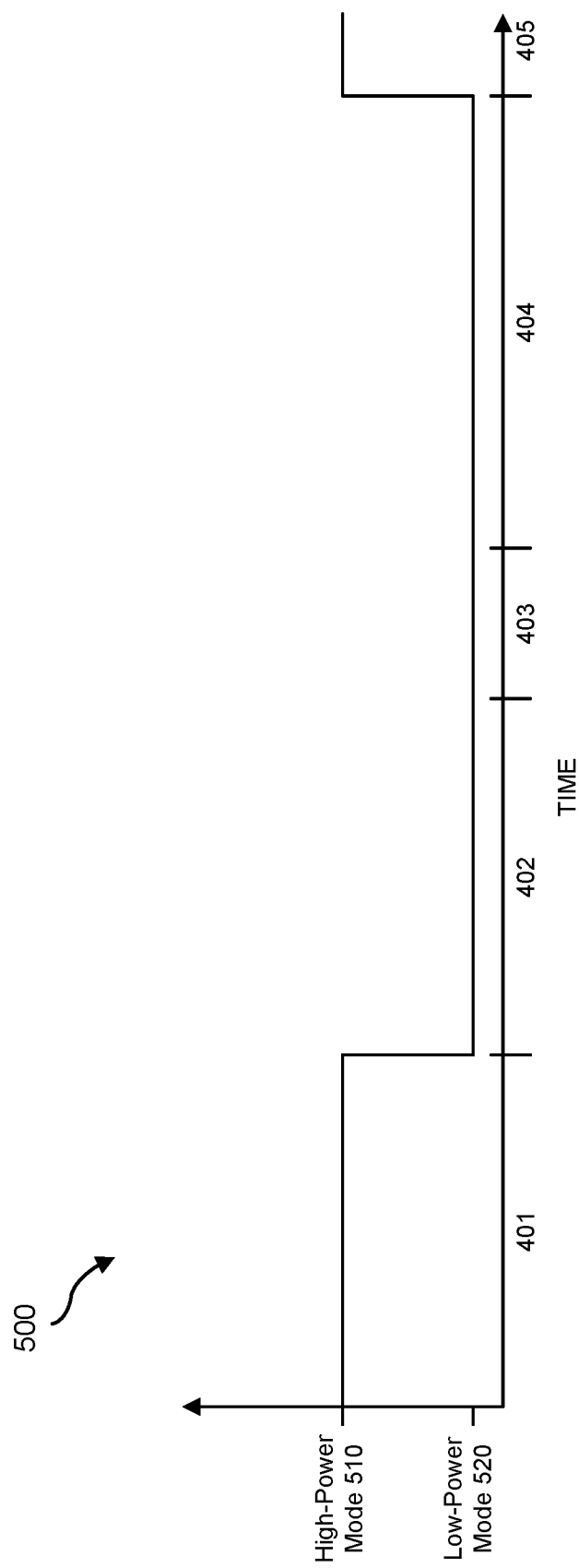
FIG. 5 is a timeline of exemplary power-mode transitions of a high-power physical processor corresponding to the exemplary display animation of FIG. 4.

FIGS. 5, 6A, 6B, and 7 illustrate exemplary power-mode timelines of high-power physical processor 120 and low-power physical processor 130 corresponding to animation timeline 400 in FIG. 4. FIG. 5 illustrates an exemplary power-mode timeline 500 of high-power physical processor 120 corresponding to animation timeline 400 in FIG. 4. As shown in power-mode timeline 500, high-power physical processor 120 may initially be in a high-power mode 510 (e.g., an operating mode) during time period 401. Near or at the boundary between time period 401 and 402, high-power physical processor 120 may transition from high-power mode 510 to low-power mode 520 (e.g., a sleep mode). In this example, high-power physical processor 120 remains in low-power mode 520 during time periods 402, 403, and 404. Near or at the boundary between time period 404 and 405, high-power physical processor 120 may transition from low-power mode 520 back to high-power mode 510. Since high-power physical processor 120 is in low-power mode 520 during time periods 402, 403, and 404, high-power physical processor 120 may, during these time periods, conserve an amount of energy equal to the difference between the amount of energy that would have been consumed while in high-power mode 510 and the amount of energy consumed while in low-power mode 520.

FIG. 6A illustrates an exemplary power-mode timeline 600 of low-power physical processor 130 corresponding to animation timeline 400 in FIG. 4. As shown in power-mode timeline 600, low-power physical processor 130 may initially be in either a high-power mode 610 (e.g., an operating mode) or a low-power mode 620 (e.g., a sleep mode) during time period 401. If low-power physical processor 130 was in low-power mode 620, low-power physical processor 130 may transition from low-power mode 620 to high-power mode 610 near or at the boundary between time period 401 and 402 and may begin animating always on display 110 with frames 420. In this example, low-power physical processor 130 may animate always on display 110 while in high-power mode 610. However, during time periods 402 and 404, low-power physical processor 130 may animate always on display 110 at a low enough frame rate that low-power physical processor 130 is able to transition to low-power mode 620 between frames.

FIG. 6B illustrates an alternative exemplary power-mode timeline 602 of low-power physical processor 130 corresponding to animation timeline 400 in FIG. 4. As shown in power-mode timeline 600, low-power physical processor 130 may initially be in either a high-power mode 610 or a low-power mode 620 during time period 401. If low-power physical processor 130 was in low-power mode 620, low-power physical processor 130 may transition from low-power mode 620 to high-power mode 610 near or at the boundary between time period 401 and 402 and may begin animating always on display 110 with frames 420. In this example, low-power physical processor 130 may animate always on display 110 while in high-power mode 610. In some examples, low-power physical processor 130 may animate always on display 110 during time periods 402 and 404 at a high enough frame rate that low-power physical processor 130 is unable to transition to low-power mode 620 between frames. In other examples, low-power physical processor 130 may animate always on display 110 at a low enough frame rate that low-power physical processor 130 is able to perform additional operations between frames.

Figure 7:
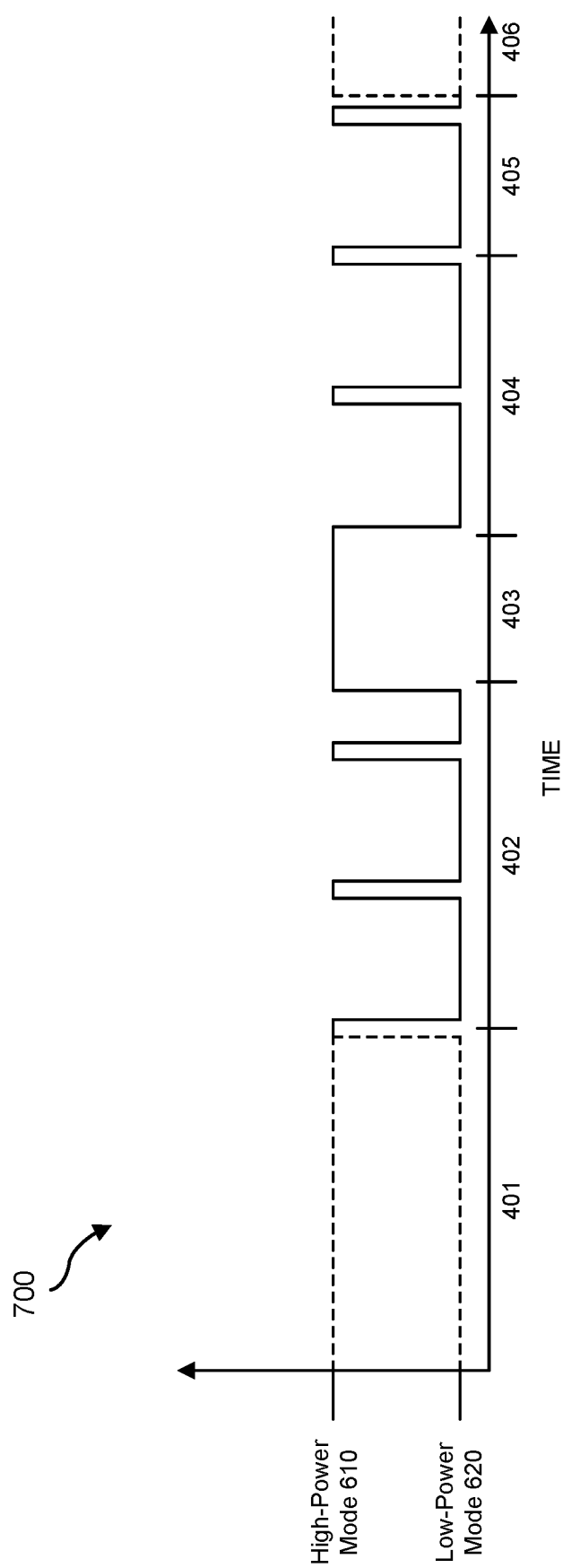
FIG. 7 is a timeline of additional exemplary power-mode transitions of a low-power physical processor corresponding to the exemplary display animation of FIG. 4.

FIG. 7 illustrates an alternative exemplary power-mode timeline 700 of low-power physical processor 130 corresponding to animation timeline 400 in FIG. 4. In this example, low-power physical processor 130 may be animating always on display 110 by writing frames to two frame buffers associated with always on display 110. As shown in power-mode timeline 700, low-power physical processor 130 may initially be in either a high-power mode 610 or a low-power mode 620 during time period 401. If low-power physical processor 130 was in low-power mode 620, low-power physical processor 130 may transition from low-power mode 620 to high-power mode 610 near or at the boundary between time period 401 and 402 and may begin animating always on display 110 with frames 420. In this example, low-power physical processor 130 may animate always on display 110 while in high-power mode 610. However, during time periods 402 and 404, low-power physical processor 130 may animate always on display 110 at a low enough frame rate that low-power physical processor 130 is able to transition to low-power mode 620 between writing two frames of frames 420 and/or 440 to frame buffers associated with always on display 110.

Figure 8:
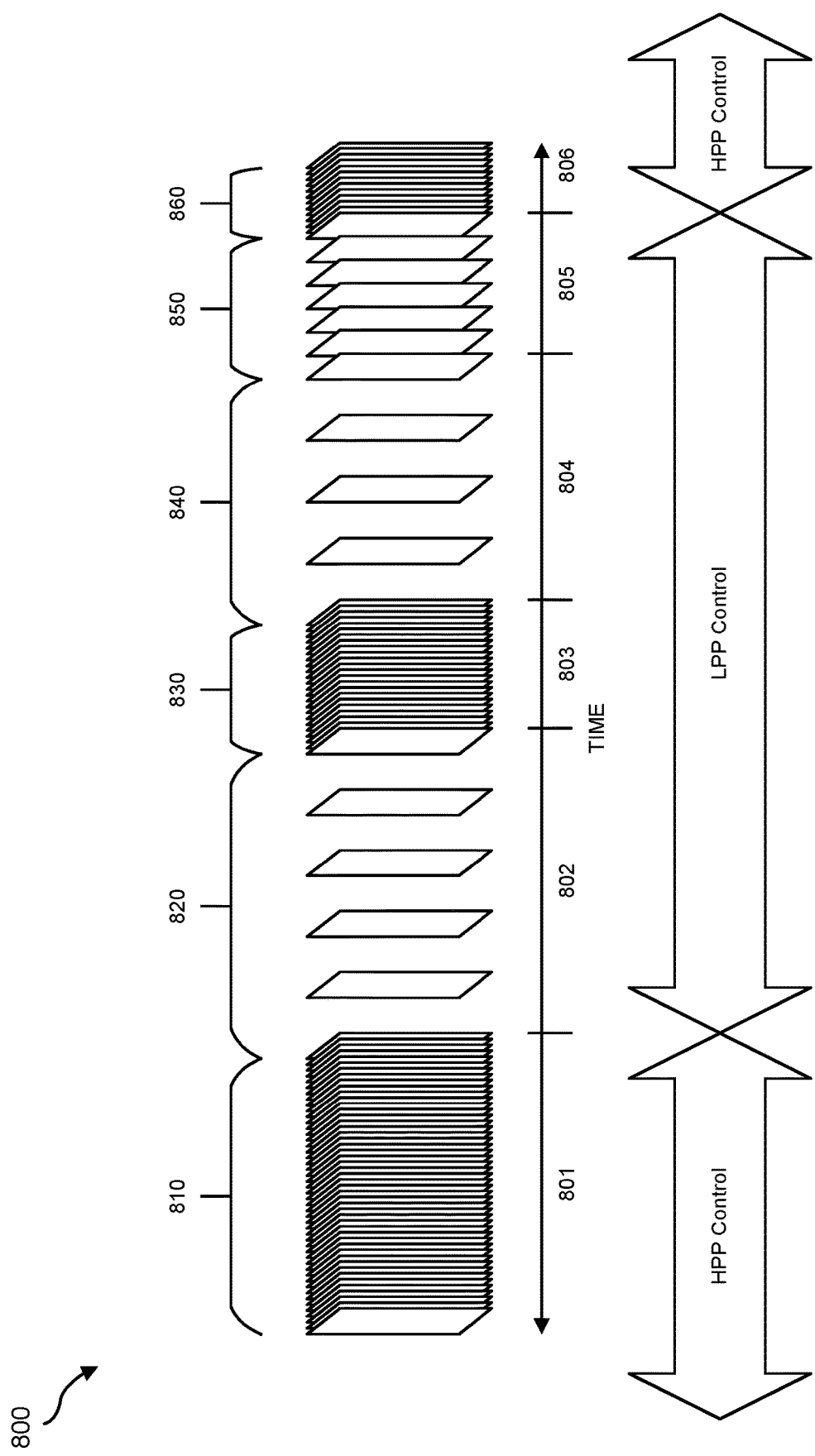
FIG. 8 is a timeline of exemplary display animations having variable frame rates.

FIG. 8 illustrates an exemplary animation timeline 800 of always on display 110 having consecutive time periods 801, 802, 803, 804, 805, and 806. In this example, high-power physical processor 120 may initially control always on display 110 and may animate always on display 110 with frames 810 during time period 801. After control of always on display 110 is transferred from high-power physical processor 120 to low-power physical processor 130, low-power physical processor 130 may animate always on display 110 with frames 820, 830, 840, and 850 during time periods 802, 803, 804, and 805, respectively. After control of always on display 110 is transferred from low-power physical processor 130 back to high-power physical processor 120, high-power physical processor 120 may animate always on display 110 with frames 860 during time period 806. In this example, low-power physical processor 130 may display frames 830 at a higher frame rate than the frame rates at which frames 820, 840, and 850 are displayed and may display frames 850 at a higher frame rate than the frame rate at which frames 820 and 840 are displayed. On the other hand, high-power physical processor 120 may display frames 810 and/or frames 860 at a higher frame rate than the frame rates at which frames 820, 830, 840, and 850 are displayed. In some embodiments, low-power physical processor 130 may display frames 830 at a sufficiently high frame rate (e.g., greater than 10 frames per second) to cause elements contained in frames 830 to be perceived as in motion and/or display frames 820, 840, and 850 at a lower frame rate to cause elements contained in frames 820, 840, and 850 to be perceived as static and/or unmoving. Additionally or alternatively, low-power physical processor 130 may display frames 850 at a sufficiently high frame rate (e.g., greater than 10 frames per second) to cause elements contained in frames 850 to be perceived as in motion.

Figure 9:
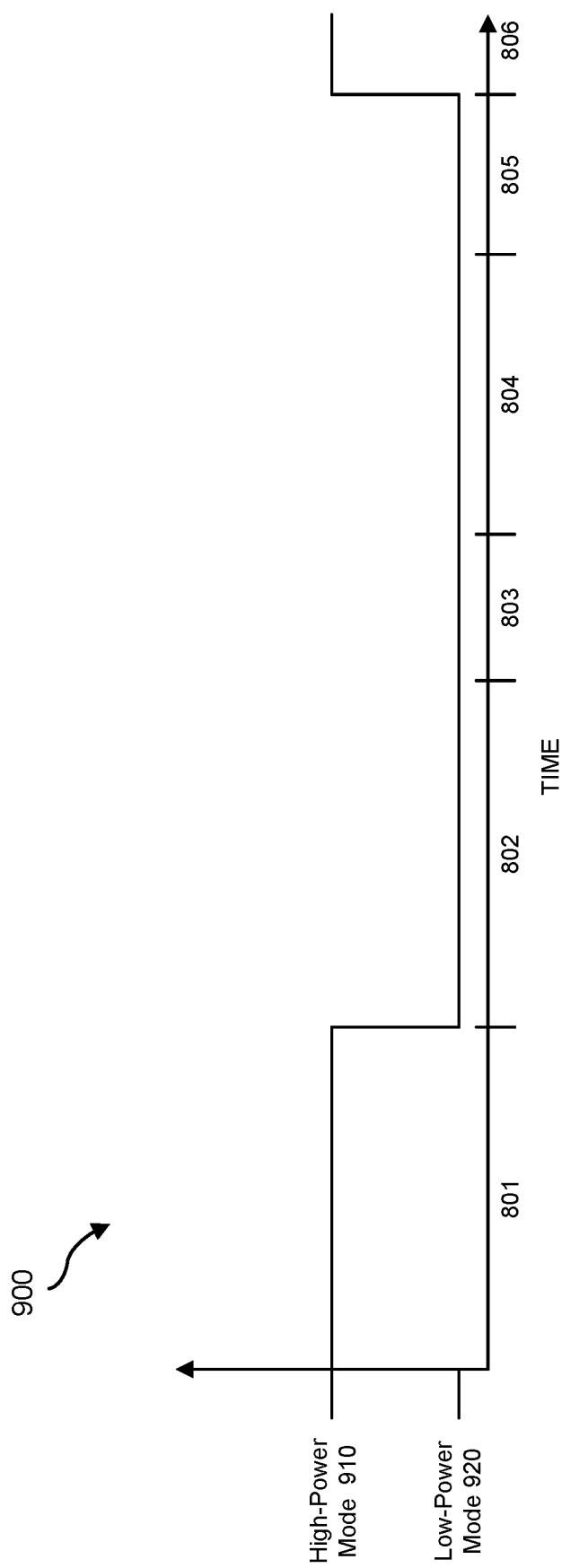
FIG. 9 is a timeline of exemplary power-mode transitions of a high-power physical processor corresponding to the exemplary display animation of FIG. 8.
Figure 10:
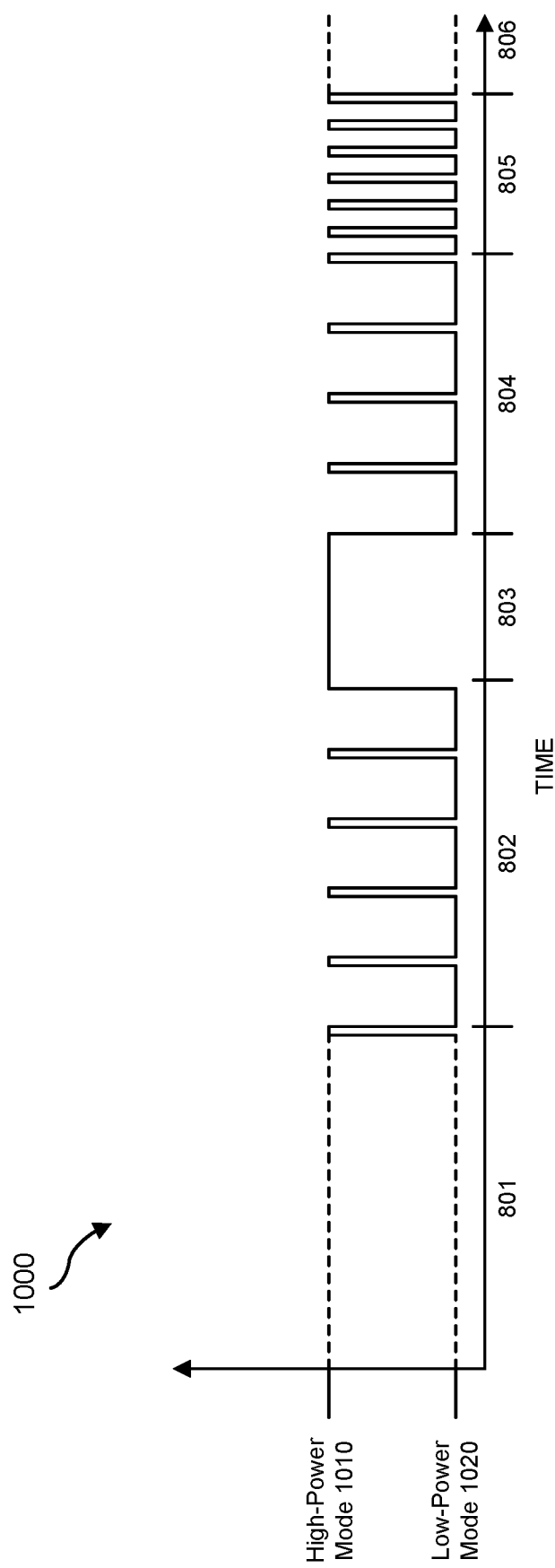
FIG. 10 is a timeline of exemplary power-mode transitions of a low-power physical processor corresponding to the exemplary display animation of FIG. 8.
Figure 11:
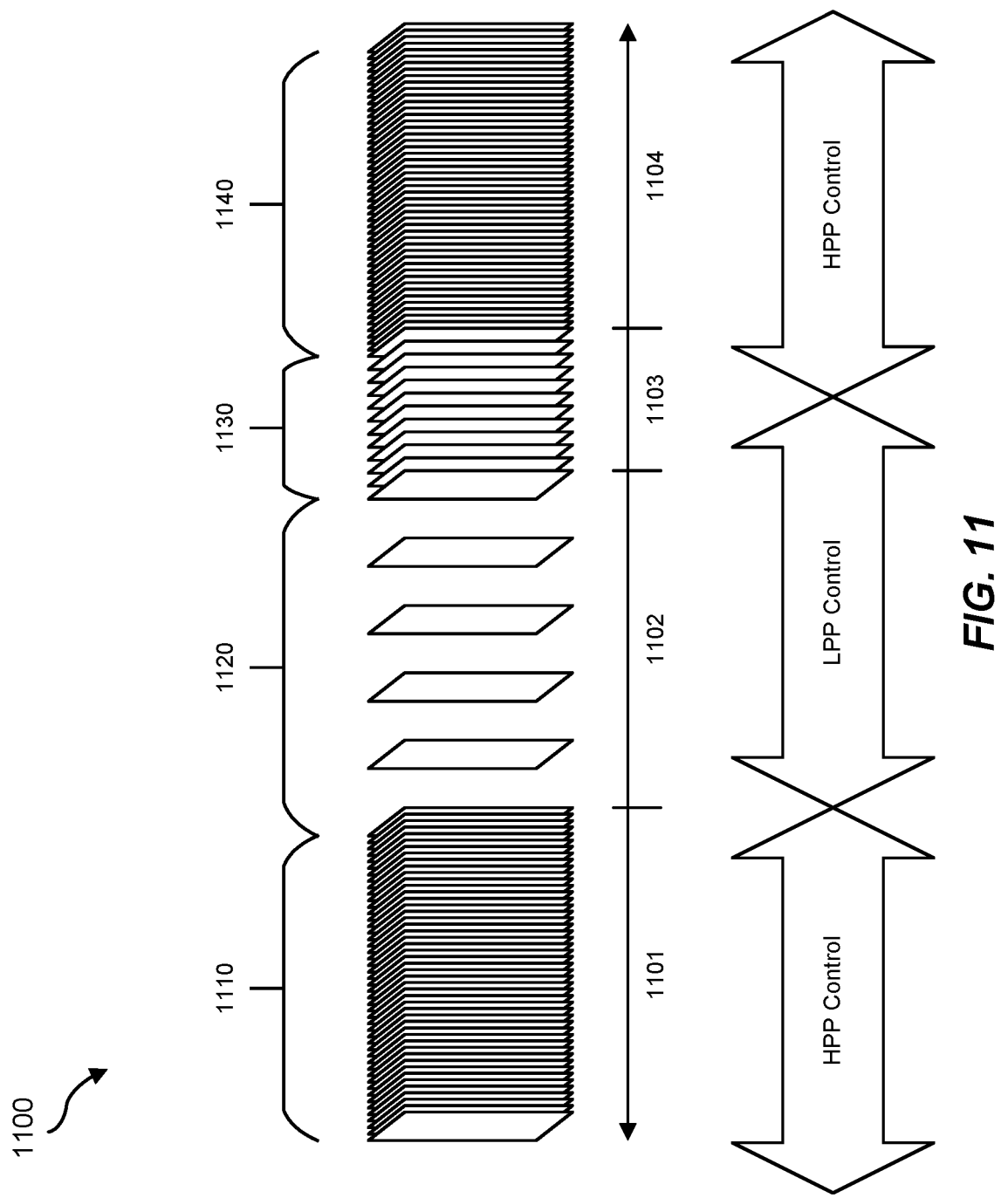
FIG. 11 is a timeline of exemplary display animations having variable frame rates.

FIGS. 9, 10, and 11 illustrate exemplary power-mode timelines of high-power physical processor 120 and low-power physical processor 130 corresponding to animation timeline 800 in FIG. 8. FIG. 9 illustrates an exemplary power-mode timeline 900 of high-power physical processor 120 corresponding to animation timeline 800 in FIG. 8. As shown in power-mode timeline 900, high-power physical processor 120 may initially be in a high-power mode 910 (e.g., an operating mode) during time period 801. Near or at the boundary between time period 801 and 802, high-power physical processor 120 may transition from high-power mode 910 to low-power mode 920 (e.g., a sleep mode). In this example, high-power physical processor 120 remains in low-power mode 920 during time periods 802, 803, 804, and 805. Near or at the boundary between time period 805 and 806, high-power physical processor 120 may transition from low-power mode 920 back to high-power mode 910.

FIG. 10 illustrates an exemplary power-mode timeline 1000 of low-power physical processor 130 corresponding to animation timeline 800 in FIG. 8. As shown in power-mode timeline 1000, low-power physical processor 130 may initially be in either a high-power mode 1010 (e.g., an operating mode) or a low-power mode 1020 (e.g., a sleep mode) during time period 801. If low-power physical processor 130 was in low-power mode 1020, low-power physical processor 130 may transition from low-power mode 1020 to high-power mode 1010 near or at the boundary between time period 801 and 802 and may begin animating always on display 110 with frames 820. In this example, low-power physical processor 130 may animate always on display 110 while in high-power mode 1010. However, during at least time periods 802, 804, and 805, low-power physical processor 130 may animate always on display 110 at low enough frame rates that low-power physical processor 130 is able to transition to low-power mode 1020 between frames.

FIG. 11 illustrates an exemplary animation timeline 1100 of always on display 110 having consecutive time periods 1101, 1102, 1103, and 1104. In this example, high-power physical processor 120 may initially control always on display 110 and may animate always on display 110 with frames 1110 during time period 1101. After control of always on display 110 is transferred from high-power physical processor 120 to low-power physical processor 130, low-power physical processor 130 may animate always on display 110 with frames 1120 during time period 1102. During time period 1103, low-power physical processor 130 may begin to animate always on display 110 with frames 1130. Before low-power physical processor 130 finishes the animation represented by frames 1130, control of always on display 110 may be transferred from low-power physical processor 130 back to high-power physical processor 120, and high-power physical processor 120 may finish animating always on display 110 with frames 1130 during the remainder of time period 1103. After animating always on display 110 with frames 1130, high-power physical processor 120 may animate always on display 110 with frames 1140 during time period 1104. In this example, low-power physical processor 130 and high-power physical processor 120 may display frames 1130 at a higher frame rate than the frame rate at which frames 1120 are displayed, and high-power physical processor 120 may display frames 1110 and/or frames 1140 at a higher frame rate than the frame rates at which frames 1120 and 1130 are displayed.

Figure 12:
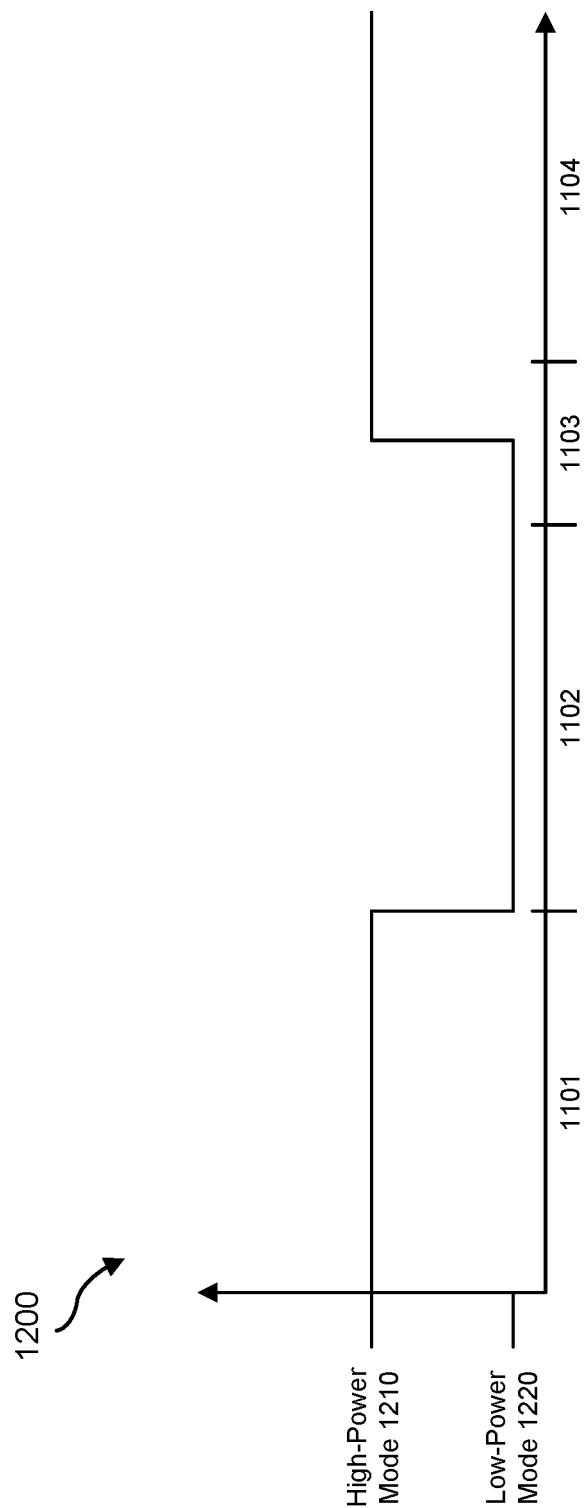
FIG. 12 is a timeline of exemplary power-mode transitions of a high-power physical processor corresponding to the exemplary display animation of FIG. 11.
Figure 13:
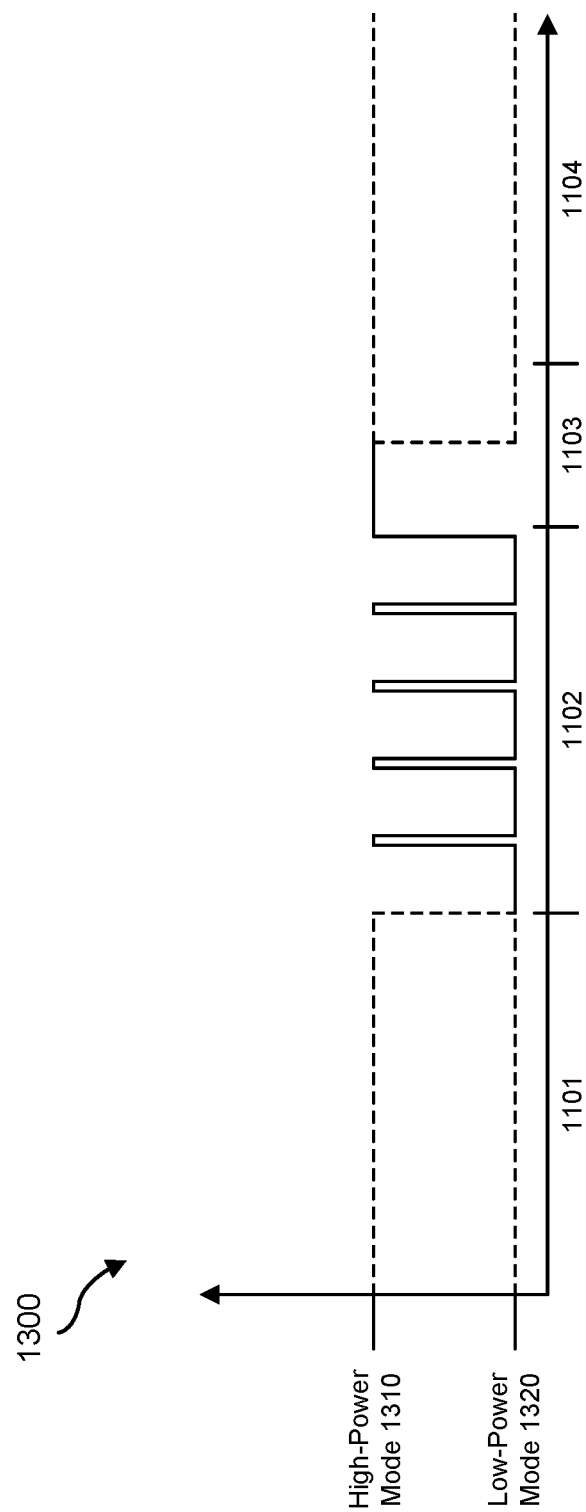
FIG. 13 is a timeline of exemplary power-mode transitions of a low-power physical processor corresponding to the exemplary display animation of FIG. 11.

FIGS. 12 and 13 illustrate exemplary power-mode timelines of high-power physical processor 120 and low-power physical processor 130 corresponding to animation timeline 1100 in FIG. 11. FIG. 12 illustrates an exemplary power-mode timeline 1200 of high-power physical processor 120 corresponding to animation timeline 1100 in FIG. 11. As shown in power-mode timeline 1200, high-power physical processor 120 may initially be in a high-power mode 1210 (e.g., an operating mode) during time period 1101. Near or at the boundary between time period 1101 and 1102, high-power physical processor 120 may transition from high-power mode 1210 to low-power mode 1220 (e.g., a sleep mode). In this example, high-power physical processor 120 may remain in low-power mode 1220 during all of time period 1102. However during time period 1103, high-power physical processor 120 may transition from low-power mode 1220 back to high-power mode 1210 and regain control of always on display 110.

FIG. 13 illustrates an exemplary power-mode timeline 1300 of low-power physical processor 130 corresponding to animation timeline 1100 in FIG. 11. As shown in power-mode timeline 1300, low-power physical processor 130 may initially be in either a high-power mode 1310 (e.g., an operating mode) or a low-power mode 1320 (e.g., a sleep mode) during time period 1101. If low-power physical processor 130 was in low-power mode 1320, low-power physical processor 130 may transition from low-power mode 1320 to high-power mode 1310 near or at the boundary between time period 1101 and 1102 and may begin animating always on display 110 with frames 1120. In this example, low-power physical processor 130 may animate always on display 110 while in high-power mode 1310. However, during time period 1102, low-power physical processor 130 may animate always on display 110 at a low enough frame rate that low-power physical processor 130 is able to transition to low-power mode 1320 between frames. In this example, low-power physical processor 130 may transition to low-power mode 1320 or remain in high-power mode 1310 when high-power physical processor 120 regains control of always on display 110.

Figure 14:
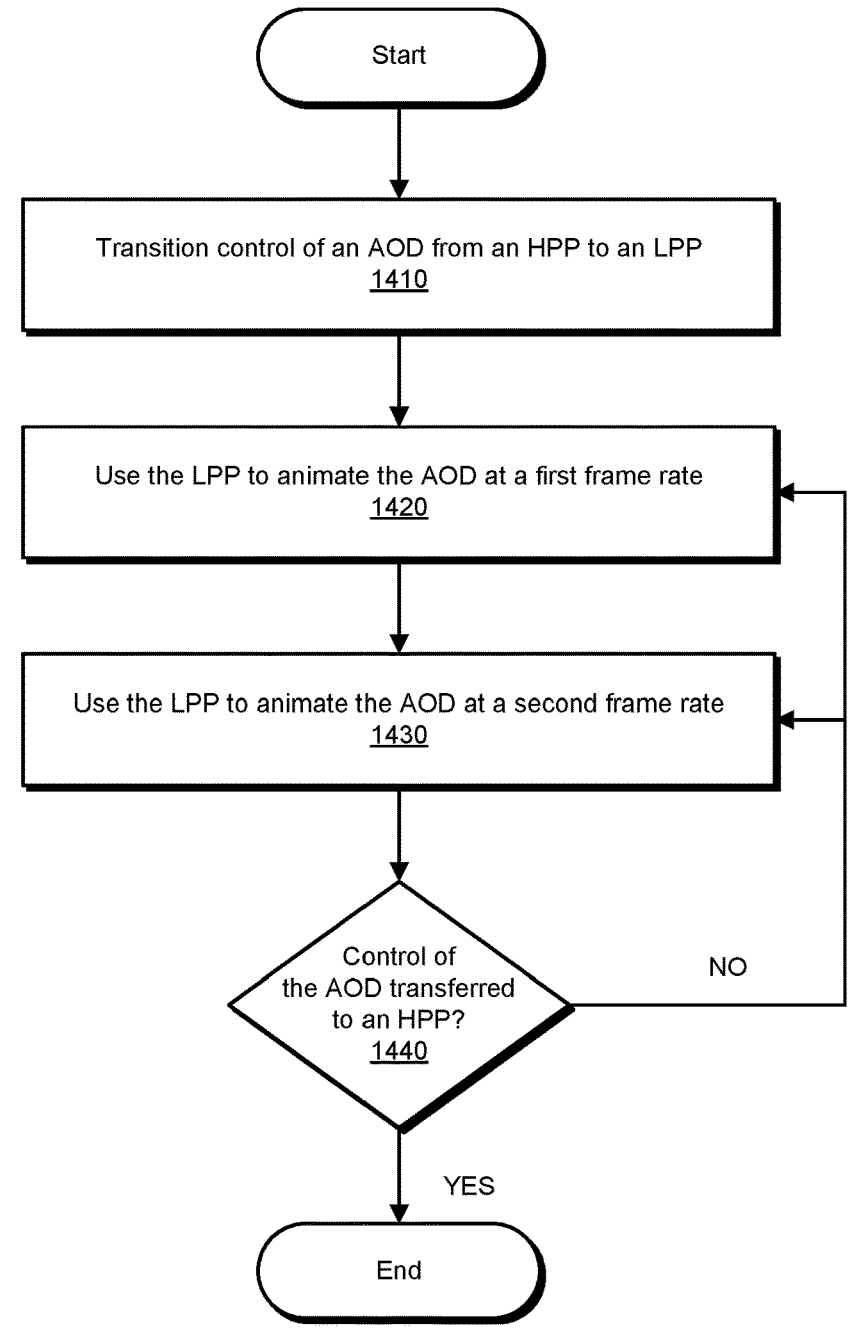
FIG. 14 is a flow diagram of an exemplary method for animating an always on display using a low-power physical processor.

FIG. 14 is a flow diagram of an exemplary computer-implemented method 1400 for animating always on displays using low-power physical processors. The steps shown in FIG. 14 may be performed by any suitable computer-executable code and/or computing system, including the system(s) illustrated in FIG. 1, 2, or 3. In one example, each of the steps shown in FIG. 14 may represent an algorithm whose structure includes and/or is represented by multiple sub-steps, examples of which will be provided in greater detail below.

As illustrated in FIG. 14, at step 1410 one or more of the systems described herein may transfer control of an always on display (AOD) from a high-power physical processor (HPP) to a low-power physical processor (LPP). For example, controlling module 144 may, as part of high-power subsystem 210 or 310 and/or low-power subsystem 230 or 330, transfer control of always on display 110 from high-power physical processor 120 to low-power physical processor 130.

The systems described herein may perform step 1410 in a variety of ways. In one example, the disclosed systems may transfer control of an always on display from a high-power physical processor to a low-power physical processor as part of a power-mode transition of the high-power physical processor. For example, power-managing module 148 may, as part of high-power subsystem 210 or 310, instruct low-power physical processor 130 to take control of always on display 110 as part of placing high-power physical processor 120 in a sleep mode. In this example, controlling module 144 may, as part of low-power subsystem 230 or 330, cause low-power physical processor 130 to begin controlling always on display 110 in response to receiving such instructions. Additionally or alternatively, controlling module 144 may monitor the current operating state of high-power physical processor 120 and may cause low-power physical processor 130 to begin controlling always on display 110 whenever high-power physical processor 120 enters a low-power state.

At step 1420 one or more of the systems described herein may use the low-power physical processor to animate the always on display at a first frame rate. For example, animating module 146 may, as part of low-power subsystem 230 or 330, use low-power physical processor 130 to animate always on display 110 at a first frame rate. At step 1430 one or more of the systems described herein may use the LPP to animate the AOD at a second frame rate. For example, animating module 146 may, as part of low-power subsystem 230 or 330, use low-power physical processor 130 to animate always on display 110 at a second frame rate.

The systems described herein may perform steps 1420 and/or 1430 in a variety of ways. In one example, the disclosed systems may designate one or more high-frame-rate animations for display via always on display 110 in response to events or conditions (e.g., interrupt conditions) and/or may designate one or more low-frame-rate animations for display via always on display 110 between occurrences of such events or conditions. In some examples, animating module 146 may, as part of low-power physical processor 130, animate always on display 110 with an animation designated for an event or condition whenever the event or condition occurs. Examples of events or conditions for which the disclosed systems may display a designated animation include, without limitation, an expiration of a timer, a transition between power modes, a reception of a network packet, a reception of a message over a serial or parallel communication interface, an occurrence of a user action (such as a gesture), a notification from a sensor indicating that new data is available, an occurrence of a user-defined event, variations or combinations of one or more of the same, or any other type or form of event or condition.

In some examples, the disclosed systems may run high-frame-rate animations in short bursts as needed. In some examples, the disclosed systems may run high-frame-rate animations infrequently between long periods of low-frame-rate animations. While the animation timelines illustrated in FIGS. 4, 8, and 11 show an initial low-frame-rate animation followed by a subsequent high-frame-rate animation, the disclosed systems may run high-frame-rate animations and low-frame-rate animations in any order.

At step 1440 one or more of the systems described herein may determine if control of the AOD has been transferred to the HPP. For example, controlling module 144 may, as part of low-power subsystem 230 or 330, determine if control of always on display 110 has been transferred to high-power physical processor 120. If control of the always on display has not been transferred to the high-power physical processor, flow of method 1400 may continue to step 1420 or 1430. On the other hand if control of the always on display has been transferred to the high-power physical processor, flow of method 1400 may end.

The systems described herein may perform step 1440 in a variety of ways. In one example, the disclosed systems may transfer control of an always on display from a low-power physical processor to a high-power physical processor as part of a power-mode transition of the high-power physical processor. For example, power-managing module 148 may, as part of high-power subsystem 210 or 310, instruct low-power physical processor 130 to relinquish control of always on display 110 as part of placing high-power physical processor 120 in an awake mode. In this example, controlling module 144 may, as part of low-power subsystem 230 or 330, cause low-power physical processor 130 to stop controlling always on display 110 in response to receiving such instructions. If low-power physical processor 130 is in the middle of displaying an animation, low-power physical processor 130 may provide any information to high-power physical processor 120 needed to seamlessly complete the animation.

Figure 15:
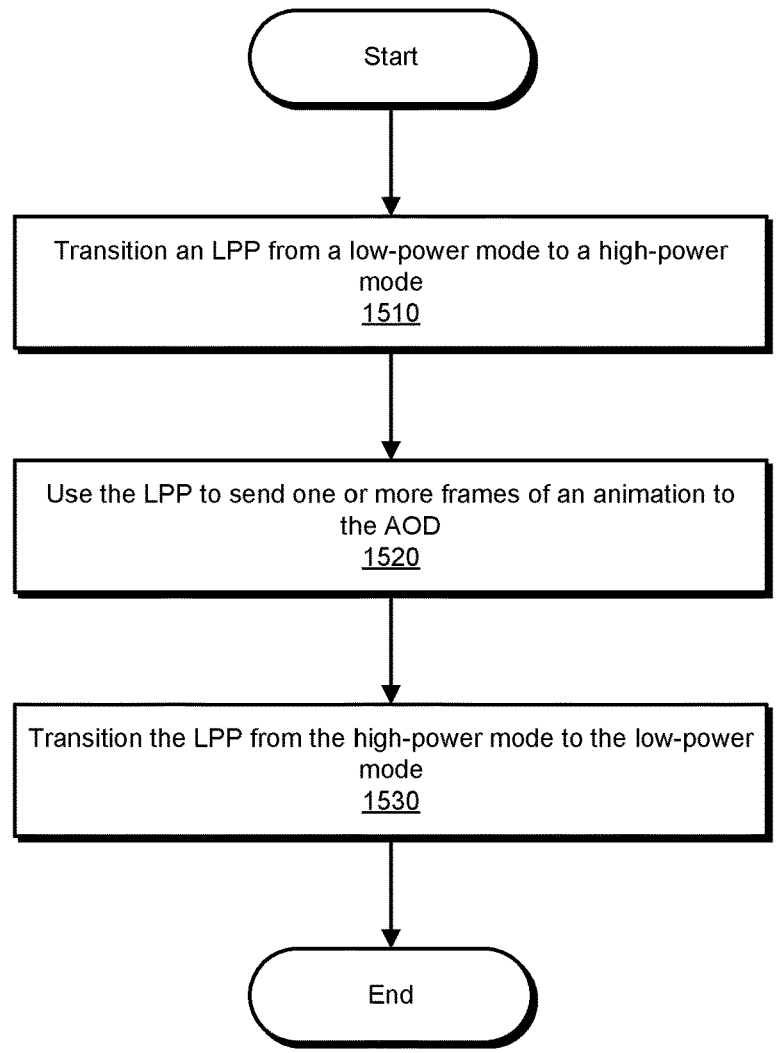
FIG. 15 is a flow diagram of another exemplary method for animating an always on display using a low-power physical processor.

FIG. 15 is a flow diagram of an exemplary computer-implemented method 1500 for animating always on displays using low-power physical processors. The steps shown in FIG. 15 may be performed by any suitable computer-executable code and/or computing system, including the system(s) illustrated in FIGS. 1, 2, and/or 3. In one example, each of the steps shown in FIG. 15 may represent an algorithm whose structure includes and/or is represented by multiple sub-steps, examples of which will be provided in greater detail below.

As illustrated in FIG. 15, at step 1510 one or more of the systems described herein may transition an LPP from a low-power mode to a high-power mode. For example, power-managing module 148 may, as part of low-power subsystem 230 or 330, transition low-power physical processor 130 from a low-power mode to a high-power mode.

The systems described herein may perform step 1510 in a variety of ways. In some embodiments, the systems described herein may transition a low-power physical processor from a low-power mode to a high-power mode using a suitable interrupt control mechanism. For example, power-managing module 148 may transition low-power physical processor 130 from a low-power mode to a high-power mode in response to an interrupt signal generated by high-power physical processor 120 (e.g., when high-power physical processor 120 transitions to its own low-power mode) and/or an interrupt signal generated by always on display 110 indicating an ability to accept a new frame for display. In some embodiments, the systems described herein may transition a low-power physical processor from a low-power mode to a high-power mode using a timer-based mechanism. For example, power-managing module 148 may use a timer-based mechanism to transition low-power physical processor 130 from a low-power mode to a high-power mode in response to an expiration of a timer.

At step 1520 one or more of the systems described herein may use the LPP to send one or more frames of an animation to the AOD. For example, animating module 146 may, as part of low-power subsystem 230 or 330, send one or more frames of one of animation(s) 212, 232, 312, or 323 to display subsystem 220 or 320 for display via always on display 110.

The systems described herein may perform step 1520 in a variety of ways. In one example, animating module 146 may transmit one or more frames of an animation directly to display subsystem 220 or 320 for display to always on display 110. Additionally or alternatively, low-power physical processor 130 may animate always on display 110 by writing one or more frames to one or more frame buffer(s) accessible to and/or monitored by a display controller of high-power subsystem 210, low-power subsystem 230, or display subsystem 320 (e.g., frame buffer(s) 214, frame buffer(s) 234, or frame buffer(s) 322). In some embodiments, the display controller may be operational even when low-power physical processor 130 is placed in a low-power mode.

At step 1530 one or more of the systems described herein may transition the LPP from the high-power mode to the low-power mode. For example, power-managing module 148 may, as part of low-power subsystem 230 or 330, transition low-power physical processor 130 from a high-power mode to a low-power mode. The systems described herein may perform step 1530 in a variety of ways. In one example, power-managing module 148 may transition low-power physical processor 130 from a high-power mode to a low-power mode whenever low-power physical processor 130 is not needed to animate always on display 110 or perform any other operation.

Figure 16:
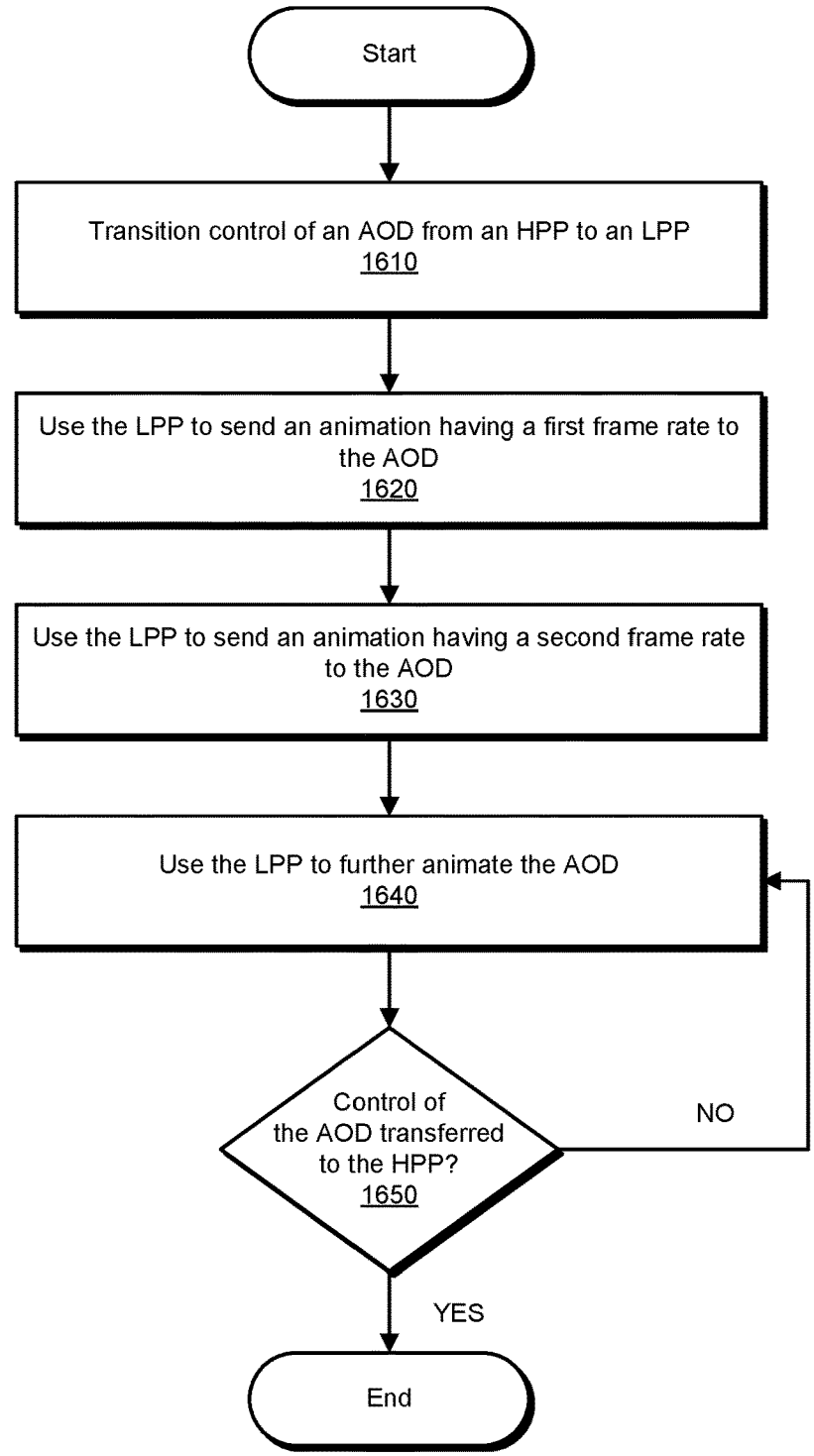
FIG. 16 is a flow diagram of an exemplary method for animating an always on display using a low-power physical processor.

FIG. 16 is a flow diagram of an exemplary computer-implemented method 1600 for animating always on displays using low-power physical processors. The steps shown in FIG. 16 may be performed by any suitable computer-executable code and/or computing system, including the system(s) illustrated in FIGS. 1, 2, and/or 3. In one example, each of the steps shown in FIG. 16 may represent an algorithm whose structure includes and/or is represented by multiple sub-steps, examples of which will be provided in greater detail below.

As illustrated in FIG. 16, at step 1610 one or more of the systems described herein may transition control of an AOD from an HPP to an LPP. For example, controlling module 144 may, as part of high-power subsystem 210 or 310 and/or low-power subsystem 230 or 330, transfer control of always on display 110 from high-power physical processor 120 to low-power physical processor 130. The systems described herein may perform step 1610 in a variety of ways including those describe in connection with step 1410 in FIG. 14.

At step 1620 one or more of the systems described herein may use the LPP to send an animation having a first frame rate to the AOD. For example, animating module 146 may, as part of low-power subsystem 230 or 330, send one of animation(s) 212, 232, 312 or 332 having a first frame rate to always on display 110. At step 1630 one or more of the systems described herein may use the LPP to send another animation having a second frame rate to the always on display. For example, animating module 146 may, as part of low-power subsystem 230 or 330, send another one of animation(s) 212, 232, 312 or 332 having a second frame rate to always on display 110. At step 1640 one or more of the systems described herein may use the LPP to further animate the always on display until control of the AOD is handed back to the HPP. For example, animating module 146 may, as part of low-power subsystem 230 or 330, continue to send animation(s) 212, 232, 312 or 332 to always on display 110 until high-power physical processor 120 regains control of always on display 110. The systems described herein may perform steps 1620, 1630, and 1640 in a variety of ways including those describe in connection with steps 1420 and 1430 in FIG. 14.

At step 1650 one or more of the systems described herein may determine if control of the AOD has been transferred to the HPP. For example, controlling module 144 may, as part of low-power subsystem 230 or 330, determine if control of always on display 110 has been transferred to high-power physical processor 120. If control of the always on display has not been transferred to the high-power physical processor, flow of method 1600 may continue to step 1640. On the other hand if control of the always on display has been transferred to the high-power physical processor, flow of method 1600 may end. The systems described herein may perform step 1650 in a variety of ways including those describe in connection with step 1440 in FIG. 14.

Figure 17:
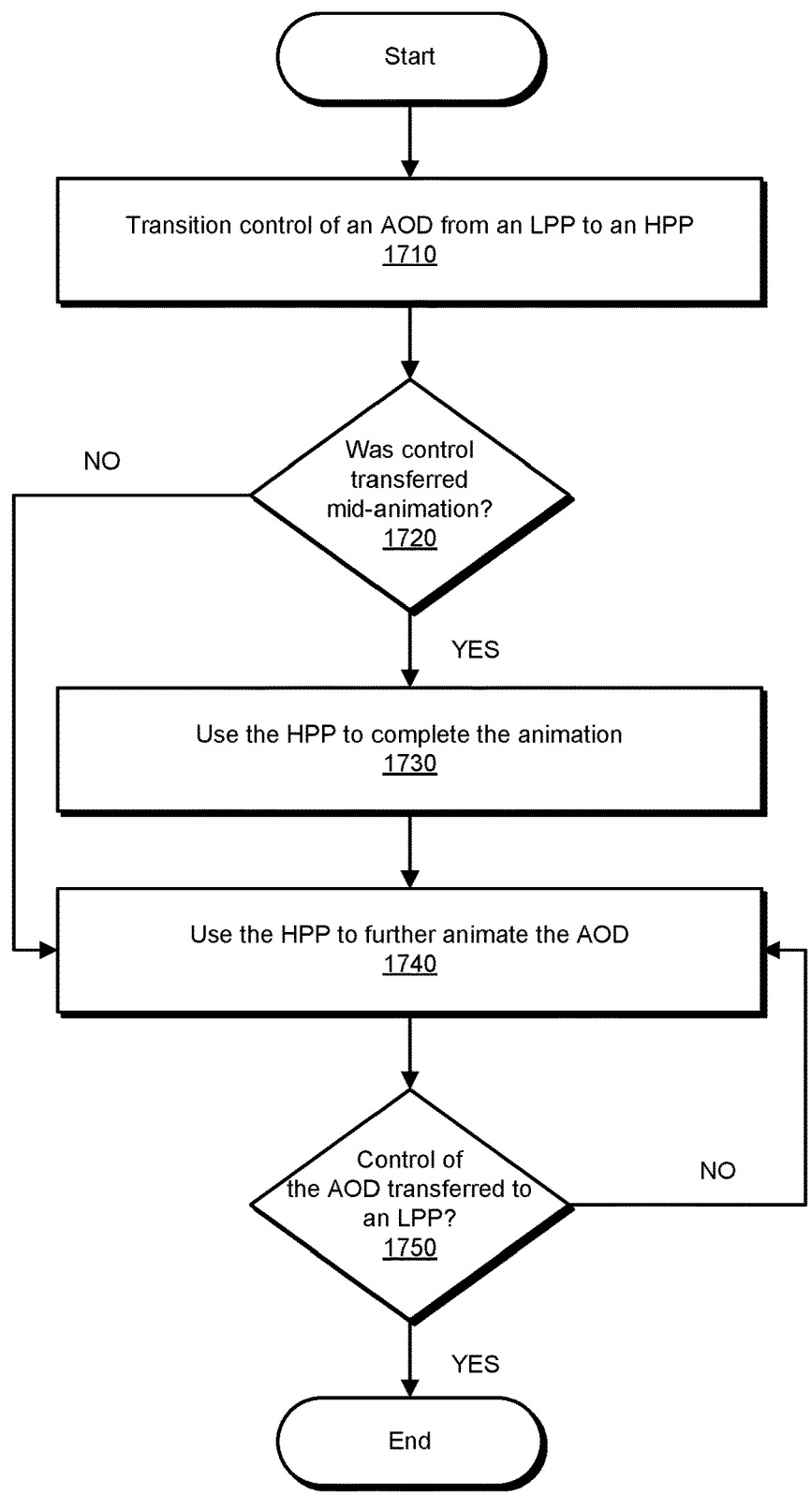
FIG. 17 is a flow diagram of an exemplary method for using a high-power physical processor to complete an animation of an always on display.

FIG. 17 is a flow diagram of an exemplary computer-implemented method 1700 for using a high-power physical processor to complete an animation of an always on display. The steps shown in FIG. 17 may be performed by any suitable computer-executable code and/or computing system, including the system(s) illustrated in FIGS. 1, 2, and/or 3. In one example, each of the steps shown in FIG. 17 may represent an algorithm whose structure includes and/or is represented by multiple sub-steps, examples of which will be provided in greater detail below.

As illustrated in FIG. 17, at step 1710 one or more of the systems described herein may transition control of an AOD from an LPP to an HPP. For example, controlling module 144 may, as part of high-power subsystem 210 or 310 and/or low-power subsystem 230 or 330, transfer control of always on display 110 from low-power physical processor 130 to high-power physical processor 120. The systems described herein may perform step 1710 in a variety of ways including those describe in connection with step 1440 in FIG. 14.

At step 1720 one or more of the systems described herein may determine if control of the AOD was transferred to the HPP mid-animation. For example, animating module 146 may, as part of high-power subsystem 210 or 310, determine if control of always on display 110 was transferred to high-power physical processor 120 before low-power physical processor 130 finished its last animation of always on display 110. If control of an always on display is transferred mid-animation, flow of method 1700 may continue to step 1730 where the animation may be completed by a high-power physical processor. On the other hand if control of the always on display was not transferred mid-animation, flow of method 1700 may continue to step 1740 where the high-power physical processor may animate the always on display until control of the always on display is transferred back to a low-power physical processor at step 1750.

Some users may be sensitive to differences between the ways in which low-power physical processors and high-power physical processors present and/or render an animation. For example, some users may be sensitive to a drastic change to the frame rate at which an animation is presented to them. In some examples, a rendering of an animation made by a low-power physical processor may not match (e.g. pixel for pixel) a rendering of the animation made by a high-power physical processor. Users may notice the mismatch if the renderings are displayed back-to-back without compensating for the differences. Differences between a low-power physical processor's rendering and the high-power physical processor's rendering may be cause by limited capabilities of the low-power physical processor. For example, a low-power physical processor's rendering of an animation may not have the same color range or lit-pixel count (due to memory constraints) as that of a high-power physical processor. Differences between a low-power physical processor's rendering and a high-power physical processor's rendering may also be cause by differences in the assets, algorithms, and/or visual effects used by the low-power physical processor and the high-power physical processor.

When control of an always on display is transferred between a low-power physical processor and a high-power physical processor while an animation is being displayed, the systems disclosed herein may use transitioning effects to reduce any noticeable differences between the low-power physical processor's rendering or presentation of the animation and the high-power physical processor's rendering or presentation of the animation. For example, the systems disclosed herein may gradually or incrementally increase or decrease frame rates during transitions between low-power physical processors and high-power physical processors in order to make the transitions less noticeable to the users.

In some examples, high-power physical processors may vary the frame rate at which they animate an always on display. For example, a high-power physical processor may sometimes animate an always on display at frame rates similar to those of a low-power physical processor. As such, differences in the frame rates at which an always on display are updated by high-power physical processors and low-power physical processors may be lessened and/or non-existent during control transitions.

Figure 18:
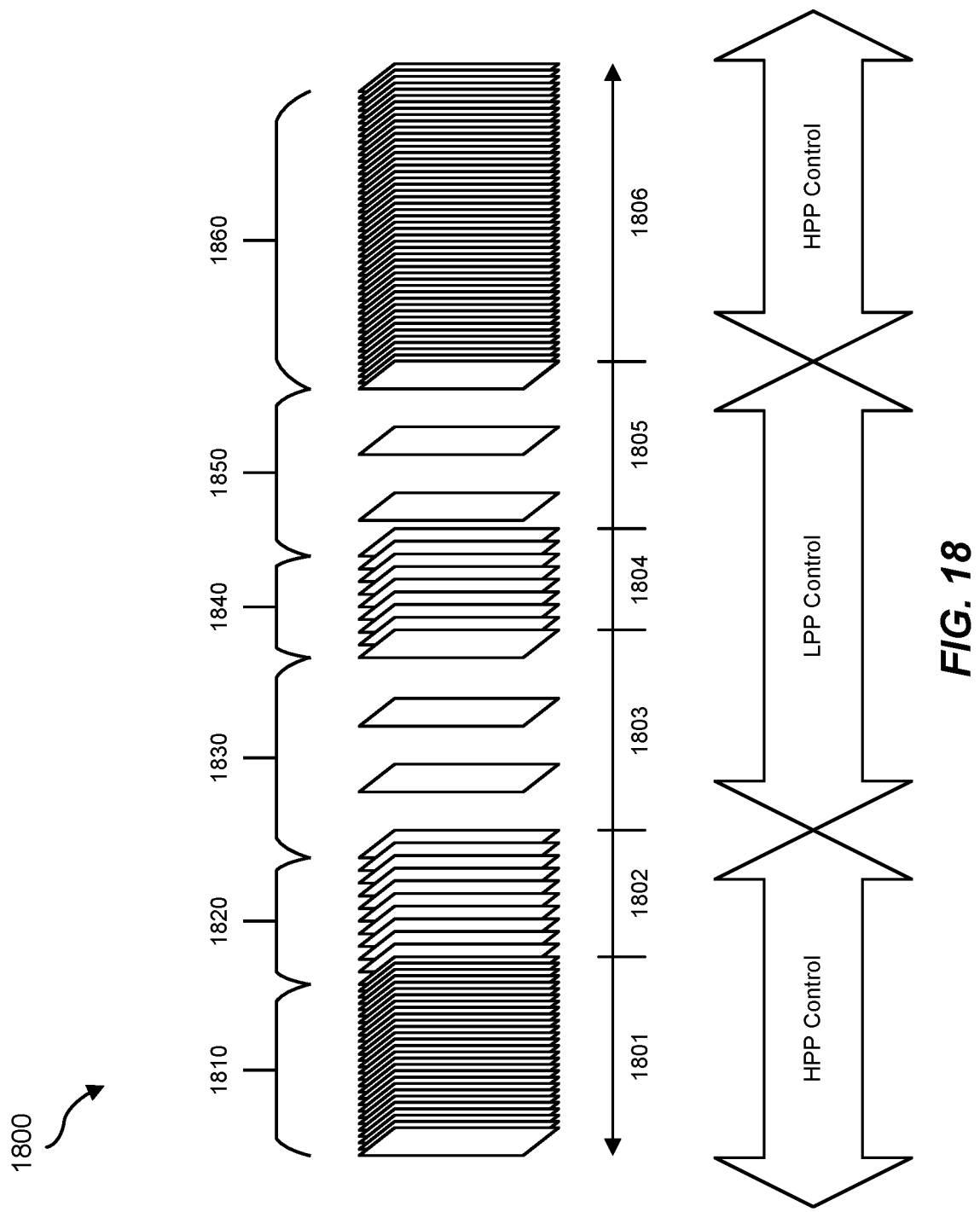
FIG. 18 is a timeline of exemplary display animations having variable frame rates.

FIG. 18 illustrates an additional exemplary animation timeline 1800 of always on display 110 having consecutive time periods 1801, 1802, 1803, 1804, 1805, and 1806. In this example, high-power physical processor 120 may initially control always on display 110 and may animate always on display 110 with frames 1810 during time period 1801 and frames 1820 during time period 1802. After control of always on display 110 is transferred from high-power physical processor 120 to low-power physical processor 130, low-power physical processor 130 may animate always on display 110 with frames 1830, 1840, and 1850 during time periods 1803, 1804, and 1805, respectively. After control of always on display 110 is transferred from low-power physical processor 130 back to high-power physical processor 120, high-power physical processor 120 may animate always on display 110 with frames 1860 during time period 1806. In this example, high-power physical processor 120 may display frames 1820 at a lower frame rate than the frame rate at which frames 1810 were displayed, and low-power physical processor 130 may display frames 1840 at a higher frame rate than the frame rate at which frames 1830 and 1850 are displayed. In this example, high-power physical processor 120 may display frames 1810 and/or frames 1860 at a higher frame rate than the frame rates at which frames 1820, 1830, 1840, and 1850 are displayed.

Figure 19:
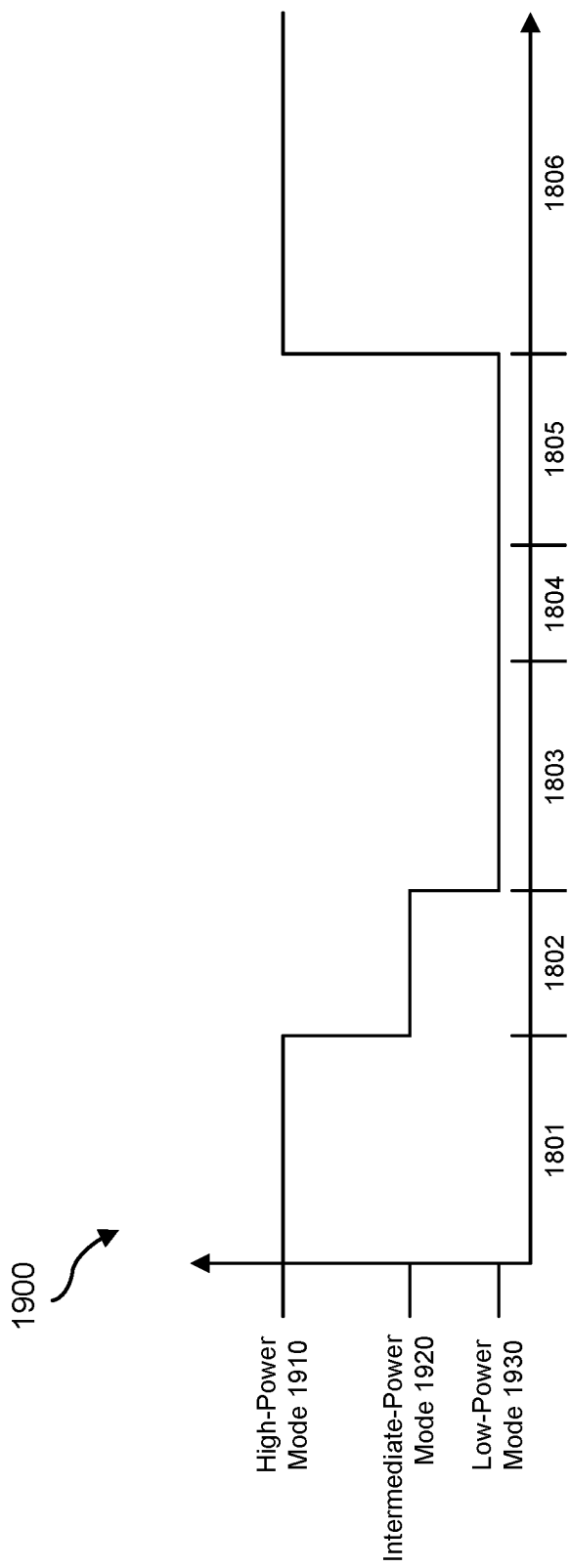
FIG. 19 is a timeline of exemplary power-mode transitions of a high-power physical processor corresponding to the exemplary display animation of FIG. 18.

FIG. 19 illustrates an exemplary power-mode timeline 1900 of high-power physical processor 120 corresponding to animation timeline 1800 in FIG. 18. As shown in power-mode timeline 1900, high-power physical processor 120 may initially be in a high-power mode 1910 (e.g., an operating mode) during time period 1801. Near or at the boundary between time period 1801 and 1802, high-power physical processor 120 may transition from high-power mode 1910 to an intermediate-power mode 1920 in which high-power physical processor 120 may animate always on display 110 at a lower frame rate. Near or at the boundary between time period 1802 and 1803, high-power physical processor 120 may transition from intermediate-power mode 1920 to low-power mode 1930 (e.g., a sleep mode). In this example, high-power physical processor 120 remains in low-power mode 1930 during time periods 1803, 1804, and 1805. Near or at the boundary between time period 1805 and 1806, high-power physical processor 120 may transition from low-power mode 1930 back to high-power mode 1910. Since high-power physical processor 120 is in intermediate-power mode 1920 and/or low-power mode 1930 during time periods 1802, 1803, 1804, and 1805, high-power physical processor 120 may conserve energy during these time periods.

As described above, embodiments of the present disclosure may use two physical processors (a low-power physical processor and a high-power physical processor) to control how animations are presented via an AOD. In some embodiments, each of the physical processors may have multiple power modes (e.g., an awake mode and a sleep mode). When a user is not interacting with the device, the high-power physical processor may transition to its sleep mode, and the low-power physical processor may be responsible for controlling the AOD. The low-power physical processor may variably transition from its sleep mode to its awake mode in order to drive frames to the AOD. In some embodiments, the low-power physical processor may run animations in short bursts at a higher frame rate between longer periods of low frame rates. For example, the low-power physical processor may drive 10 frames over 1 second (i.e., a rough animation whose elements may be perceived as in motion) then no frames for 20 seconds (i.e., a static image). When necessary, the low-power physical processor may hand control of the AOD back to the high-power physical processor for other high-power activities (e.g., checking email, making a call, etc.). If an animation is occurring during the handoff, control of the animation may be seamlessly transitioned between the low-power physical processor and the high-power physical processor.

Example Embodiments

Example 1: A computer-implemented method may include (1) transferring control of a display of a computing device from a high-power physical processor of the computing device to a low-power physical processor of the computing device, (2) animating, using the low-power physical processor, the display at a first frame rate during a first time period, (3) animating, using the low-power physical processor, the display at a second frame rate during a second time period, (4) transferring control of the display from the low-power physical processor to the high-power physical processor, and (5) animating, using the high-power physical processor, the display.

Example 2: The computer-implemented method of Example 1, where the computing device is a smartwatch, the high-power physical processor is a processing unit of a system on a chip of the smartwatch, the low-power physical processor is a processing unit of a microcontroller unit of the smartwatch, and the display is an always on display.

Example 3: The computer-implemented method of any of Examples 1-2, where animating the display at the first frame rate during the first time period may include using the low-power physical processor to present a first animation via the display, the first animation having the first frame rate and animating the display at the second frame rate during the second time period may include using the low-power physical processor to present a second animation via the display, the second animation having the second frame rate.

Example 4: The computer-implemented method of any of Examples 1-3, where (1) animating the display at the first frame rate during the first time period may include using the low-power physical processor to present a first portion of an animation via the display, the first portion of the animation having the first frame rate and (2) animating the display at the second frame rate during the second time period may include using the low-power physical processor to present a second portion of the animation via the display, the second portion of the animation having the second frame rate.

Example 5: The computer-implemented method of any of Examples 1-4, wherein a first power mode of the low-power physical processor required to animate the display consumes less power than a second power mode of the high-power physical processor required to animate the display.

Example 6: The computer-implemented method of any of Examples 1-5, wherein transferring control of the display from the high-power physical processor to the low-power physical processor may include transitioning the high-power physical processor from the second power mode into a lower power mode.

Example 7: The computer-implemented method of any of Examples 1-6, where a first power mode of the low-power physical processor required to animate the display consumes more power than a second power mode of the low-power physical processor. In this Example, animating the display at the first frame rate during the first time period may include, for each of a plurality of frames, (1) causing the low-power physical processor to transition from the second power mode to the first power mode, (2) using the low-power physical processor to present the frame via the display, and (3) causing the low-power physical processor to transition from the first power mode to the second power mode. In this Example, animating the display at the second frame rate during the second time period may include, for each of an additional plurality of frames, (1) causing the low-power physical processor to transition from the second power mode to the first power mode, (2) using the low-power physical processor to present the frame via the display, and (3) causing the low-power physical processor to transition from the first power mode to the second power mode.

Example 8: The computer-implemented method of any of Examples 1-7, where a first power mode of the low-power physical processor required to animate the display consumes more power than a second power mode of the low-power physical processor. In this Example, animating the display at the first frame rate during the first time period may include, for each of a plurality of frames (1) causing the low-power physical processor to transition from the second power mode to the first power mode, (2) using the low-power physical processor to present the frame via the display, and (3) causing the low-power physical processor to transition from the first power mode to the second power mode. In this Example, animating the display at the second frame rate during the second time period may include (1) causing the low-power physical processor to transition from the second power mode to the first power mode and (2) using the low-power physical processor to present an additional plurality of frames at the second frame rate without causing the low-power physical processor to transition from the first power mode to the second power mode.

Example 9: The computer-implemented method of any of Examples 1-8, where transferring control of the display from the low-power physical processor to the high-power physical processor may include (1) determining if the low-power physical processor has not finished an animation of the display and (2) using the high-power physical processor to complete the animation of the display when the low-power physical processor has not finished the animation.

Example 10: The computer-implemented method of any of Examples 1-9, where the first frame rate is within a range of about ten frames per second to thirty frames per second and the second frame rate is within a range of about one frame per minute to one frame per second.

Example 11: The computer-implemented method of any of Examples 1-10, where using the high-power physical processor to complete the animation of the display includes using a transitioning effect to reduce a noticeable difference between a rendering of the animation by the low-power physical processor and a rendering of the animation by the high-power physical processor.

Example 12: A smartwatch may include (1) an always on display, (2) at least one high-power physical processor adapted to (a) transition from a low-power state to a high-power state, (b) animate the always on display while in the high-power state, and (c) transition from the high-power state to the low-power state, and (3) at least one low-power physical processor adapted to animate the always on display at two or more frame rates while the high-power physical processor is in the low-power state.

Example 13: The smartwatch of Example 12, further including (1) a system on a chip, the high-power physical processor being a processing unit of the system on a chip, and (2) a microcontroller unit separate and distinct from the system on a chip, the low-power physical processor being a processing unit of the microcontroller unit.

Example 14: The smartwatch of any of Examples 12-13, further including one or more sensors, wherein the low-power physical processor is further adapted to record measurements received from the one or more sensors.

Example 15: The smartwatch of any of Examples 12-14, where the low-power state is a sleeping state.

Example 16: The smartwatch of any of Examples 12-15, where the high-power physical processor is further adapted to (1) determine, after transitioning from the low-power state to the high-power state, if the low-power physical processor has not finished an animation of the always on display and (2) complete the animation when the low-power physical processor has not finished the animation.

Example 17: The smartwatch of any of Examples 12-16, wherein the two or more frame rates includes at least a first frame rate within a range of about ten frames per second to thirty frames per second and a second frame rate within a range of about one frame per minute to one frame per second.

Example 18: The smartwatch of any of Examples 12-17, wherein the two or more frame rates include at least a first frame rate of about ten frames per second and a second frame rate of about one frame per twenty seconds.

Example 19: A system may include (1) a display, (2) at least one high-power physical processor, (3) physical memory including computer-executable instructions that, when executed by the high-power physical processor, cause the high-power physical processor to (a) transition from a low-power state to a high-power state, (b) animate the display while in the high-power state, and (c) transition from the high-power state to the low-power state, (4) at least one low-power physical processor, and (5) additional physical memory including additional computer-executable instructions that, when executed by the low-power physical processor, cause the low-power physical processor to animate the display at two or more frame rates while the high-power physical processor is in the low-power state.

Example 20: The system of Example 19, where the two or more frame rates include at least a first frame rate within a range of about ten frames per second to thirty frames per second and a second frame rate within a range of about one frame per minute to one frame per second.

Figure 20:
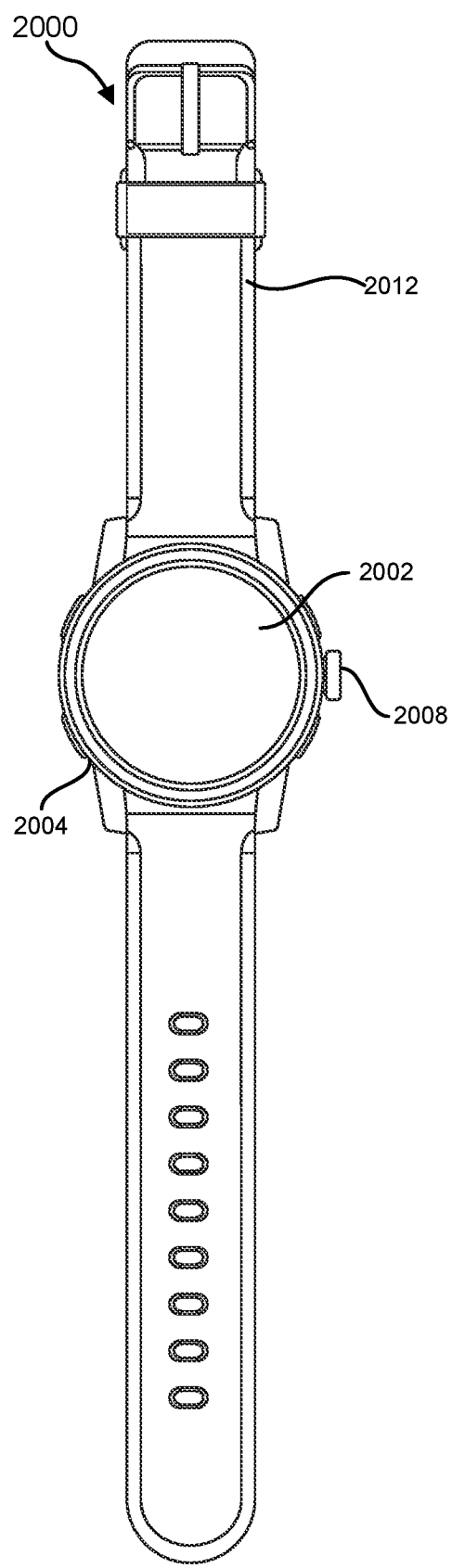
FIG. 20 is an illustration of an exemplary wristband system, according to at least one embodiment of the present disclosure.

Embodiments of the present disclosure may include or be implemented in conjunction with various types of wearable devices. FIG. 20 illustrates an example system 2000 that includes a watch body 2004 coupled to a wristband 2012. Watch body 2004 and wristband 2012 may have any size and/or shape that is configured to allow a user to wear system 2000 on a body part (e.g., a wrist). System 2000 may perform various functions associated with the user. The functions may be executed independently in watch body 2004, independently in wristband 2012, and/or in communication between watch body 2004 and wristband 2012. Functions executed by system 2000 may include, without limitation, display of visual content to the user (e.g., visual content displayed on display screen 2002), sensing user input (e.g., sensing a touch on button 2008, sensing biometric data or neuromuscular signals, messaging (e.g., text, speech, video, etc.), image capture, wireless communications (e.g., cellular, near field, WiFi, personal area network, etc.), location determination, financial transactions, providing haptic feedback, etc. Functions may be executed on system 2000 in conjunction with an artificial-reality system.

Wristband 2012 may be donned (e.g., worn) on a body part (e.g., a wrist) of a user and may operate independently from watch body 2004. For example, wristband 2012 may be configured to be worn by a user and an inner surface of wristband 2012 may be in contact with the user's skin. As described in detail below with reference to FIG. 21, an electromyography sensor integrated into wristband 112 may sense a user's muscle intention. The sensed muscle intention may be transmitted to an artificial-reality system (e.g., the augmented-reality system 2000 in FIG. 20 or the virtual-reality system 2100 in FIG. 21) to perform an action in an associated artificial-reality environment, such as to control a physical and/or virtual object displayed to the user.

Figure 21:
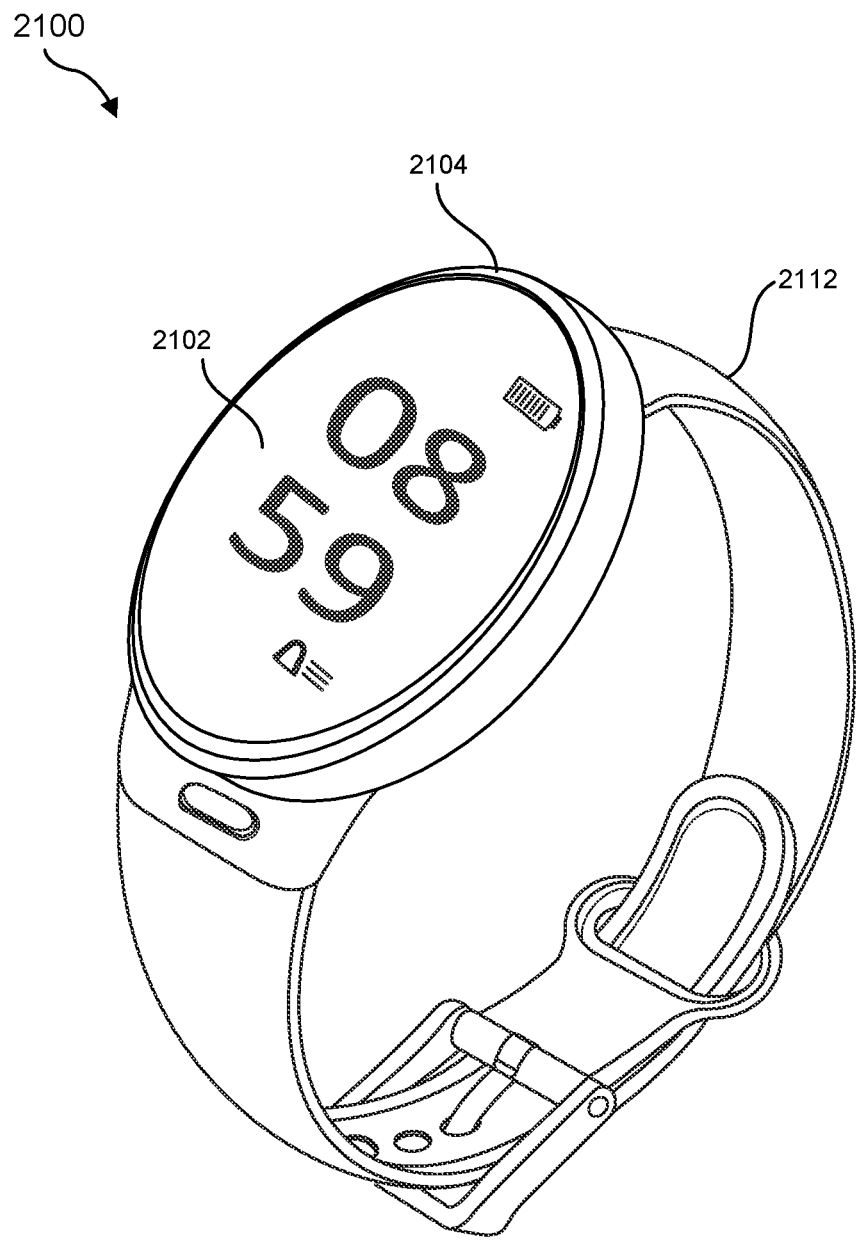
FIG. 21 is a perspective view of another exemplary wristband system, according to at least one embodiment of the present disclosure.

FIG. 21 illustrates a perspective view of an example wristband system 2100 that includes a watch body 2104 coupled to a wristband 2112. Wristband system 2100 may be structured and/or function similarly to wristband system 2000 of FIG. 20. Watch body 2104 and wristband 2112 may have a substantially rectangular or circular shape and may be configured to allow a user to wear wristband system 2100 on a body part (e.g., a wrist). Wristband system 2100 may perform various functions associated with the user as described above with reference to FIG. 20. Example functions executed by wristband system 2100 may include, without limitation, display of visual content to the user (e.g., visual content displayed on display screen 2102), sensing biometric data via bioelectrodes, sensing neuromuscular signals via bioelectrodes, messaging (e.g., text, speech, video, etc.), image capture, wireless communications (e.g., cellular, near field, WiFi, personal area network, etc.), location determination, financial transactions, providing haptic feedback, etc. These functions may be executed independently in watch body 2104, independently in wristband 2112, and/or in communication between watch body 2104 and wristband 2112. Functions may be executed on wristband system 2100 in conjunction with an artificial-reality system such as the artificial-reality systems described in FIGS. 20-23B.

Wristband 2112 may be configured to be worn by a user such that an inner surface of wristband 2112 may be in contact with the user's skin. When worn by a user, bioelectrodes may be in contact with the user's skin. Wristband 2112 may transmit the data acquired by bioelectrodes to watch body 2104 using a wired communication method and/or a wireless communication method. Wristband 2112 may be configured to operate (e.g., to collect data using bioelectrodes) independent of whether watch body 2104 is coupled to or decoupled from wristband 2112.

In some examples, wristband 2112 may include signal acquisition circuitry. In some examples signal acquisition circuitry may sense a user's muscle intention. The sensed muscle intention may be transmitted to an artificial-reality (AR) system to perform an action in an associated artificial-reality environment, such as to control the motion of a virtual device displayed to the user. Further, the artificial-reality system may provide haptic feedback to the user in coordination with the artificial-reality application via a haptic device. Signals from signal acquisition circuitry may be used to provide a user with an enhanced interaction with a physical object and/or a virtual object in an AR environment generated by an AR system. Signals from signal acquisition circuitry may be obtained (e.g., sensed and recorded) through one or more bioelectrodes. In some examples, wristband 2112 may include a plurality of bioelectrodes arranged circumferentially on an inside surface of wristband 2112 such that the plurality of bioelectrodes contact the skin of the user. Signal acquisition circuitry may sense and record neuromuscular signals from the user as the user performs muscular activations (e.g., movements, gestures, etc.). The muscular activations performed by the user may include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user may include symbolic gestures (e.g., gestures mapped to other gestures, interactions, or commands, for example, based on a gesture vocabulary that specifies the mapping of gestures to commands).

The bioelectrodes disclosed herein may be implemented into, conformed to, and/or suitably shaped to fit a variety of wearable devices. In some examples, the terms "wearable" and "wearable device" may refer to any type or form of computing device that is worn by a user of an artificial-reality system and/or visual display system as part of an article of clothing, an accessory, and/or an implant. In one example, a wearable device may include and/or represent a wristband secured to and/or worn by the wrist of a user. Additional examples of wearable devices include, without limitation, armbands, pendants, bracelets, rings, jewelry, anklebands, clothing, electronic textiles, shoes, clips, headsets, headbands, head-mounted displays, gloves, glasses, variations or combinations of one or more of the same, and/or any other suitable wearable devices.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 2200 in FIG. 22) or that visually immerses a user in an artificial reality (such as, e.g., virtual-reality system 2300 in FIG. 23). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 22:
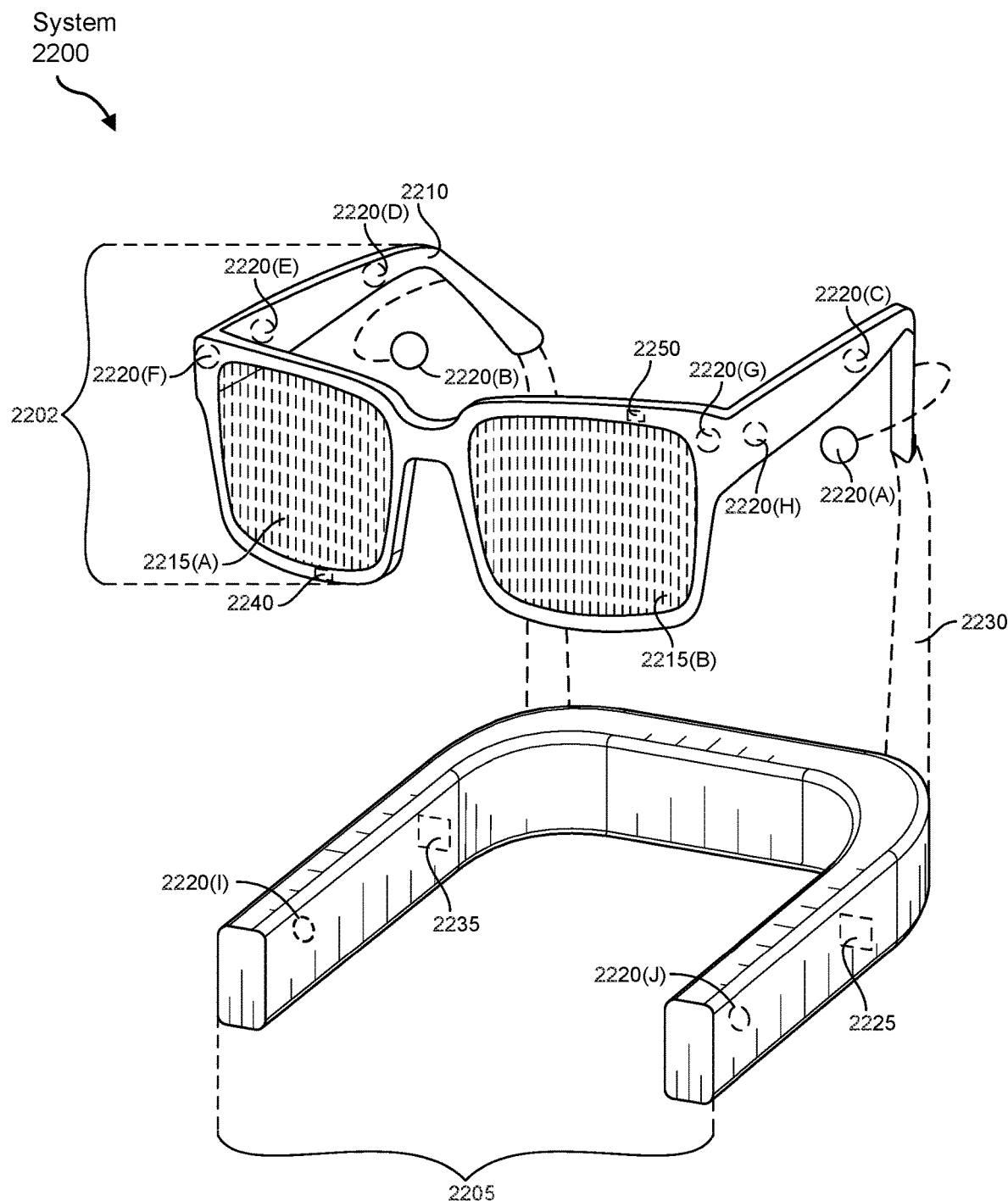
FIG. 22 is an illustration of exemplary augmented-reality glasses that may be used in connection with embodiments of this disclosure.
Figure 23:
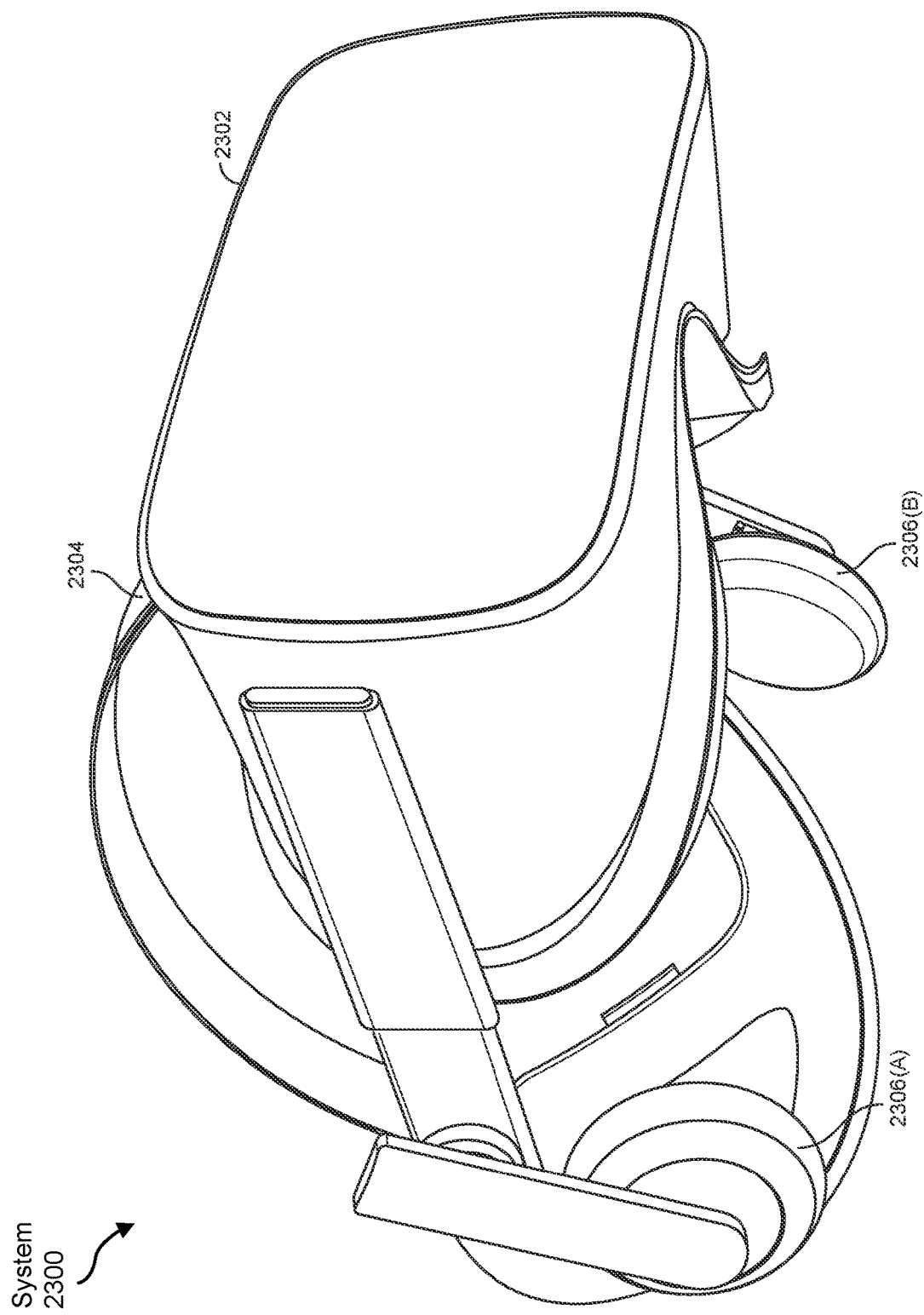
FIG. 23 is an illustration of an exemplary virtual-reality headset that may be used in connection with embodiments of this disclosure.

Turning to FIG. 22, augmented-reality system 2200 may include an eyewear device 2202 with a frame 2210 configured to hold a left display device 2215(A) and a right display device 2215(B) in front of a user's eyes. Display devices 2215(A) and 2215(B) may act together or independently to present an image or series of images to a user. While augmented-reality system 2200 includes two displays, embodiments of this disclosure may be implemented in augmented-reality systems with a single NED or more than two NEDs.

In some embodiments, augmented-reality system 2200 may include one or more sensors, such as sensor 2240. Sensor 2240 may generate measurement signals in response to motion of augmented-reality system 2200 and may be located on substantially any portion of frame 2210. Sensor 2240 may represent one or more of a variety of different sensing mechanisms, such as a position sensor, an inertial measurement unit (IMU), a depth camera assembly, a structured light emitter and/or detector, or any combination thereof. In some embodiments, augmented-reality system 2200 may or may not include sensor 2240 or may include more than one sensor. In embodiments in which sensor 2240 includes an IMU, the IMU may generate calibration data based on measurement signals from sensor 2240. Examples of sensor 2240 may include, without limitation, accelerometers, gyroscopes, magnetometers, other suitable types of sensors that detect motion, sensors used for error correction of the IMU, or some combination thereof.

In some examples, augmented-reality system 2200 may also include a microphone array with a plurality of acoustic transducers 2220(A)-2220(J), referred to collectively as acoustic transducers 2220. Acoustic transducers 2220 may represent transducers that detect air pressure variations induced by sound waves. Each acoustic transducer 2220 may be configured to detect sound and convert the detected sound into an electronic format (e.g., an analog or digital format). The microphone array in FIG. 22 may include, for example, ten acoustic transducers: 2220(A) and 2220(B), which may be designed to be placed inside a corresponding ear of the user, acoustic transducers 2220(C), 2220(D), 2220(E), 2220(F), 2220(G), and 2220(H), which may be positioned at various locations on frame 2210, and/or acoustic transducers 2220(I) and 2220(J), which may be positioned on a corresponding neckband 2205.

In some embodiments, one or more of acoustic transducers 2220(A)-(J) may be used as output transducers (e.g., speakers). For example, acoustic transducers 2220(A) and/or 2220(B) may be earbuds or any other suitable type of headphone or speaker.

The configuration of acoustic transducers 2220 of the microphone array may vary. While augmented-reality system 2200 is shown in FIG. 22 as having ten acoustic transducers 2220, the number of acoustic transducers 2220 may be greater or less than ten. In some embodiments, using higher numbers of acoustic transducers 2220 may increase the amount of audio information collected and/or the sensitivity and accuracy of the audio information. In contrast, using a lower number of acoustic transducers 2220 may decrease the computing power required by an associated controller 2250 to process the collected audio information. In addition, the position of each acoustic transducer 2220 of the microphone array may vary. For example, the position of an acoustic transducer 2220 may include a defined position on the user, a defined coordinate on frame 2210, an orientation associated with each acoustic transducer 2220, or some combination thereof.

Acoustic transducers 2220(A) and 2220(B) may be positioned on different parts of the user's ear, such as behind the pinna, behind the tragus, and/or within the auricle or fossa. Or, there may be additional acoustic transducers 2220 on or surrounding the ear in addition to acoustic transducers 2220 inside the ear canal. Having an acoustic transducer 2220 positioned next to an ear canal of a user may enable the microphone array to collect information on how sounds arrive at the ear canal. By positioning at least two of acoustic transducers 2220 on either side of a user's head (e.g., as binaural microphones), augmented-reality device 2200 may simulate binaural hearing and capture a 3D stereo sound field around about a user's head. In some embodiments, acoustic transducers 2220(A) and 2220(B) may be connected to augmented-reality system 2200 via a wired connection 2230, and in other embodiments acoustic transducers 2220(A) and 2220(B) may be connected to augmented-reality system 2200 via a wireless connection (e.g., a BLUETOOTH connection). In still other embodiments, acoustic transducers 2220(A) and 2220(B) may not be used at all in conjunction with augmented-reality system 2200.

Acoustic transducers 2220 on frame 2210 may be positioned in a variety of different ways, including along the length of the temples, across the bridge, above or below display devices 2215(A) and 2215(B), or some combination thereof. Acoustic transducers 2220 may also be oriented such that the microphone array is able to detect sounds in a wide range of directions surrounding the user wearing the augmented-reality system 2200. In some embodiments, an optimization process may be performed during manufacturing of augmented-reality system 2200 to determine relative positioning of each acoustic transducer 2220 in the microphone array.

In some examples, augmented-reality system 2200 may include or be connected to an external device (e.g., a paired device), such as neckband 2205. Neckband 2205 generally represents any type or form of paired device. Thus, the following discussion of neckband 2205 may also apply to various other paired devices, such as charging cases, smart watches, smart phones, wrist bands, other wearable devices, hand-held controllers, tablet computers, laptop computers, other external compute devices, etc.

As shown, neckband 2205 may be coupled to eyewear device 2202 via one or more connectors. The connectors may be wired or wireless and may include electrical and/or non-electrical (e.g., structural) components. In some cases, eyewear device 2202 and neckband 2205 may operate independently without any wired or wireless connection between them. While FIG. 22 illustrates the components of eyewear device 2202 and neckband 2205 in example locations on eyewear device 2202 and neckband 2205, the components may be located elsewhere and/or distributed differently on eyewear device 2202 and/or neckband 2205. In some embodiments, the components of eyewear device 2202 and neckband 2205 may be located on one or more additional peripheral devices paired with eyewear device 2202, neckband 2205, or some combination thereof.

Pairing external devices, such as neckband 2205, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 2200 may be provided by a paired device or shared between a paired device and an eyewear device, thus reducing the weight, heat profile, and form factor of the eyewear device overall while still retaining desired functionality. For example, neckband 2205 may allow components that would otherwise be included on an eyewear device to be included in neckband 2205 since users may tolerate a heavier weight load on their shoulders than they would tolerate on their heads. Neckband 2205 may also have a larger surface area over which to diffuse and disperse heat to the ambient environment. Thus, neckband 2205 may allow for greater battery and computation capacity than might otherwise have been possible on a stand-alone eyewear device. Since weight carried in neckband 2205 may be less invasive to a user than weight carried in eyewear device 2202, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 2205 may be communicatively coupled with eyewear device 2202 and/or to other devices. These other devices may provide certain functions (e.g., tracking, localizing, depth mapping, processing, storage, etc.) to augmented-reality system 2200. In the embodiment of FIG. 22, neckband 2205 may include two acoustic transducers (e.g., 2220(I) and 2220(J)) that are part of the microphone array (or potentially form their own microphone subarray). Neckband 2205 may also include a controller 2225 and a power source 2235.

Acoustic transducers 2220(I) and 2220(J) of neckband 2205 may be configured to detect sound and convert the detected sound into an electronic format (analog or digital). In the embodiment of FIG. 22, acoustic transducers 2220(I) and 2220(J) may be positioned on neckband 2205, thereby increasing the distance between the neckband acoustic transducers 2220(I) and 2220(J) and other acoustic transducers 2220 positioned on eyewear device 2202. In some cases, increasing the distance between acoustic transducers 2220 of the microphone array may improve the accuracy of beamforming performed via the microphone array. For example, if a sound is detected by acoustic transducers 2220(C) and 2220(D) and the distance between acoustic transducers 2220(C) and 2220(D) is greater than, e.g., the distance between acoustic transducers 2220(D) and 2220(E), the determined source location of the detected sound may be more accurate than if the sound had been detected by acoustic transducers 2220(D) and 2220(E).

Controller 2225 of neckband 2205 may process information generated by the sensors on neckband 2205 and/or augmented-reality system 2200. For example, controller 2225 may process information from the microphone array that describes sounds detected by the microphone array. For each detected sound, controller 2225 may perform a direction-of-arrival (DOA) estimation to estimate a direction from which the detected sound arrived at the microphone array. As the microphone array detects sounds, controller 2225 may populate an audio data set with the information. In embodiments in which augmented-reality system 2200 includes an inertial measurement unit, controller 2225 may compute all inertial and spatial calculations from the IMU located on eyewear device 2202. A connector may convey information between augmented-reality system 2200 and neckband 2205 and between augmented-reality system 2200 and controller 2225. The information may be in the form of optical data, electrical data, wireless data, or any other transmittable data form. Moving the processing of information generated by augmented-reality system 2200 to neckband 2205 may reduce weight and heat in eyewear device 2202, making it more comfortable to the user.

Power source 2235 in neckband 2205 may provide power to eyewear device 2202 and/or to neckband 2205. Power source 2235 may include, without limitation, lithium ion batteries, lithium-polymer batteries, primary lithium batteries, alkaline batteries, or any other form of power storage. In some cases, power source 2235 may be a wired power source. Including power source 2235 on neckband 2205 instead of on eyewear device 2202 may help better distribute the weight and heat generated by power source 2235.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 2300 in FIG. 23, that mostly or completely covers a user's field of view. Virtual-reality system 2300 may include a front rigid body 2302 and a band 2304 shaped to fit around a user's head. Virtual-reality system 2300 may also include output audio transducers 2306(A) and 2306(B). Furthermore, while not shown in FIG. 23, front rigid body 2302 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 2200 and/or virtual-reality system 2300 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 2200 and/or virtual-reality system 2300 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 2200 and/or virtual-reality system 2300 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

Figure 24A:
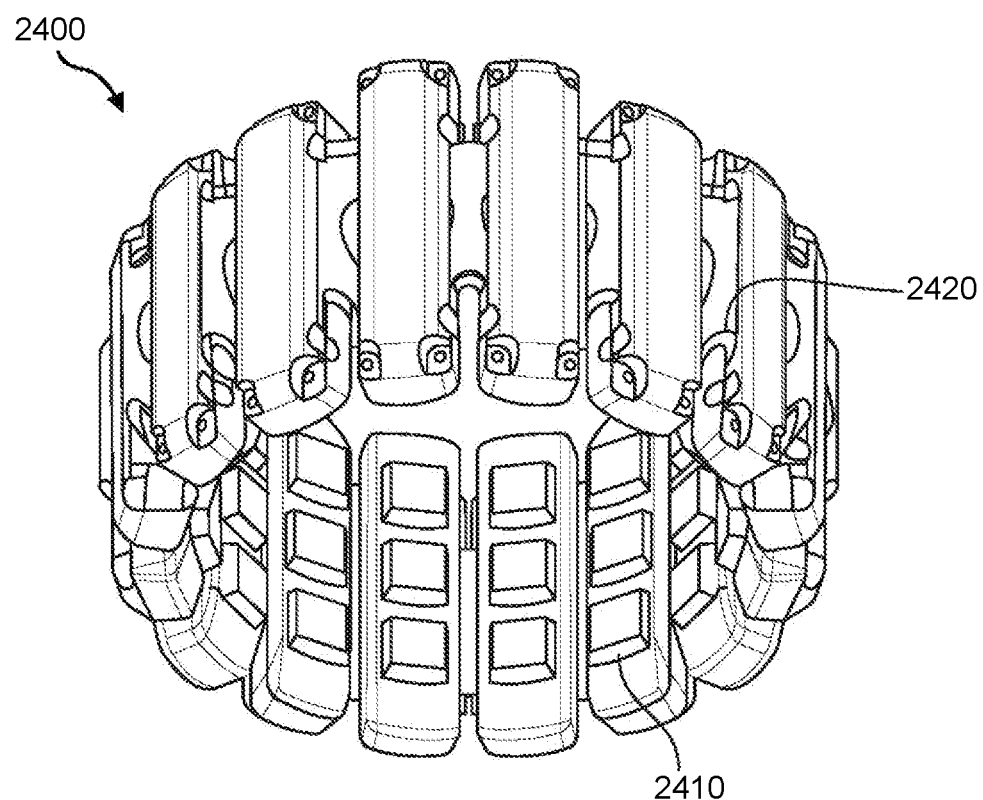
FIGS. 24A and 24B are illustrations of an exemplary human-machine interface configured to be worn around a user's lower arm or wrist.
Figure 24B:
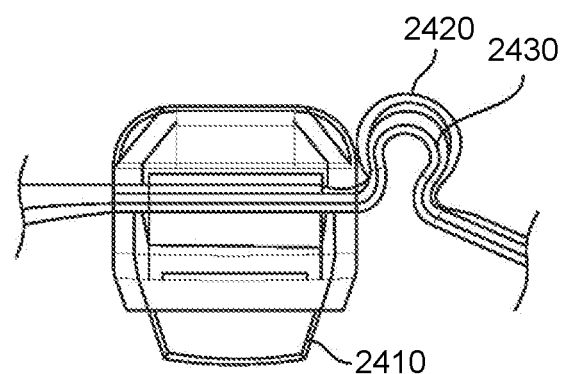

FIG. 24A illustrates an exemplary human-machine interface (also referred to herein as an EMG control interface) configured to be worn around a user's lower arm or wrist as a wearable system 2400. In this example, wearable system 2400 may include sixteen neuromuscular sensors 2410 (e.g., EMG sensors) arranged circumferentially around an elastic band 2420 with an interior surface 2430 configured to contact a user's skin. However, any suitable number of neuromuscular sensors may be used. The number and arrangement of neuromuscular sensors may depend on the particular application for which the wearable device is used. For example, a wearable armband or wristband can be used to generate control information for controlling an augmented reality system, a robot, controlling a vehicle, scrolling through text, controlling a virtual avatar, or any other suitable control task. As shown, the sensors may be coupled together using flexible electronics incorporated into the wireless device. FIG. 24B illustrates a cross-sectional view through one of the sensors of the wearable device shown in FIG. 24A. In some embodiments, the output of one or more of the sensing components can be optionally processed using hardware signal processing circuitry (e.g., to perform amplification, filtering, and/or rectification). In other embodiments, at least some signal processing of the output of the sensing components can be performed in software. Thus, signal processing of signals sampled by the sensors can be performed in hardware, software, or by any suitable combination of hardware and software, as aspects of the technology described herein are not limited in this respect. A non-limiting example of a signal processing chain used to process recorded data from sensors 2410 is discussed in more detail below with reference to FIGS. 25A and 25B.

Figure 25A:
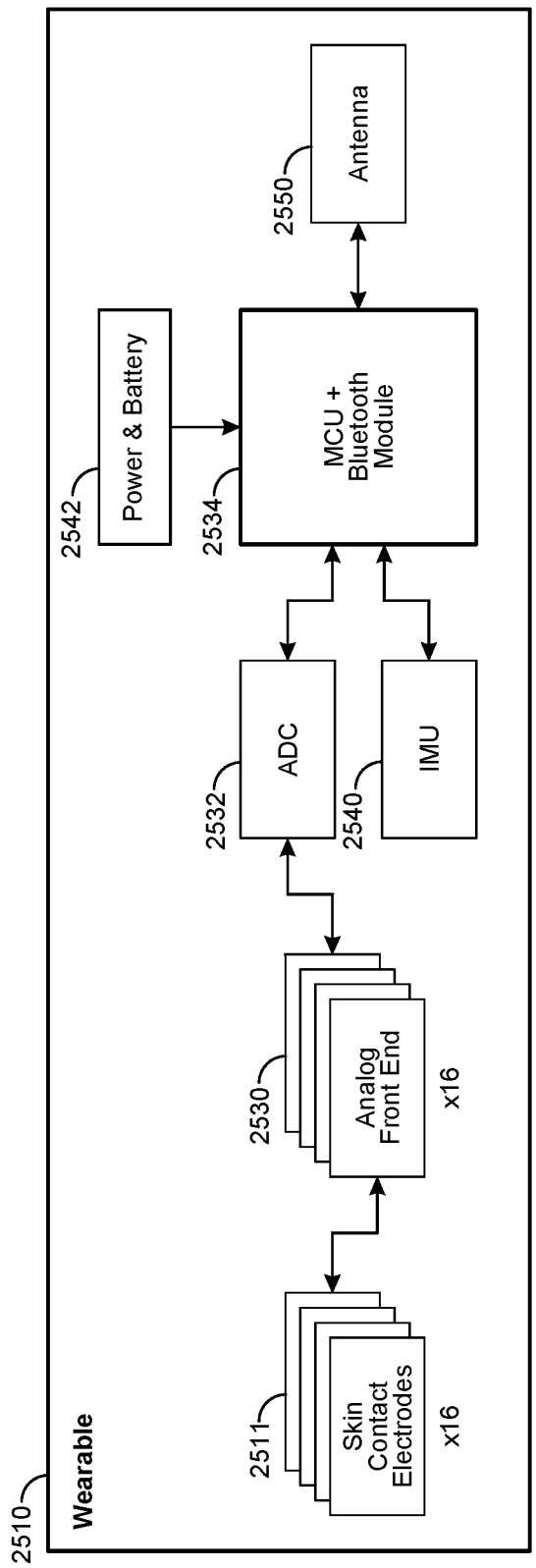
FIGS. 25A and 25B are illustrations of an exemplary schematic diagram with internal components of a wearable system.
Figure 25B:
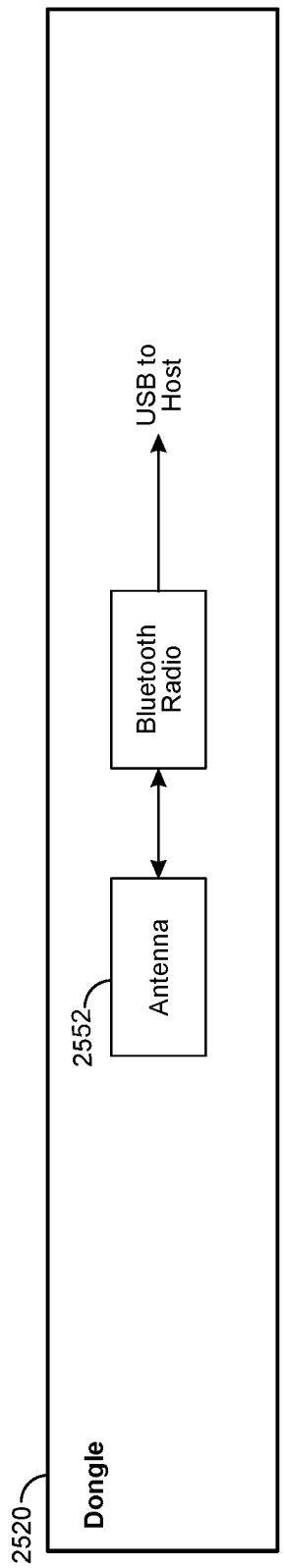

FIGS. 25A and 25B illustrate an exemplary schematic diagram with internal components of a wearable system with EMG sensors. As shown, the wearable system may include a wearable portion 2510 (FIG. 25A) and a dongle portion 2520 (FIG. 25B) in communication with the wearable portion 2510 (e.g., via BLUETOOTH or another suitable wireless communication technology). As shown in FIG. 25A, the wearable portion 2510 may include skin contact electrodes 2511, examples of which are described in connection with FIGS. 24A and 24B. The output of the skin contact electrodes 2511 may be provided to analog front end 2530, which may be configured to perform analog processing (e.g., amplification, noise reduction, filtering, etc.) on the recorded signals. The processed analog signals may then be provided to analog-to-digital converter 2532, which may convert the analog signals to digital signals that can be processed by one or more computer processors. An example of a computer processor that may be used in accordance with some embodiments is microcontroller (MCU) 2534, illustrated in FIG. 25A. As shown, MCU 2534 may also include inputs from other sensors (e.g., IMU sensor 2540), and power and battery module 2542. The output of the processing performed by MCU 2534 may be provided to antenna 2550 for transmission to dongle portion 2520 shown in FIG. 25B.

Dongle portion 2520 may include antenna 2552, which may be configured to communicate with antenna 2550 included as part of wearable portion 2510. Communication between antennas 2550 and 2552 may occur using any suitable wireless technology and protocol, non-limiting examples of which include radiofrequency signaling and BLUETOOTH. As shown, the signals received by antenna 2552 of dongle portion 2520 may be provided to a host computer for further processing, display, and/or for effecting control of a particular physical or virtual object or objects.

Although the examples provided with reference to FIGS. 24A-24B and FIGS. 25A-25B are discussed in the context of interfaces with EMG sensors, the techniques described herein for reducing electromagnetic interference can also be implemented in wearable interfaces with other types of sensors including, but not limited to, mechanomyography (MMG) sensors, sonomyography (SMG) sensors, and electrical impedance tomography (EIT) sensors. The techniques described herein for reducing electromagnetic interference can also be implemented in wearable interfaces that communicate with computer hosts through wires and cables (e.g., USB cables, optical fiber cables, etc.).

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive at least one animation to be transformed, transform the animation into at least a first animation having a first frame rate and a second animation having a second frame rate, output a result of the transformation to a low-power physical processor, use the result of the transformation to animate an always on display at the first frame rate and the second frame rate, and store the result of the transformation to a memory accessible to the low-power physical processor or a high-power physical processor (e.g., so that the high-power physical processor may complete one of the first or second animations begun by the low-power physical processor). Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method, comprising:
    transferring control of a display of a computing device from a high-power physical processor of the computing device to a low-power physical processor of the computing device based on a first operational state of two or more operational states of the computing device, wherein the first operational state utilizes a first power mode of the low-power physical processor;
    animating, using the low-power physical processor in the first power mode, the display at a first frame rate during a first time period;
    selecting a second operational state of the two or more operational states utilizing a second power mode of the low-power physical processor, wherein the second power mode required to animate the display consumes less power than the first power mode of the low-power physical processor;
    responsive to selecting the second operational state, animating, using the low-power physical processor in the second power mode, the display at a second frame rate during a second time period;
    determining that a third operational state of the two or more operational states is required for animating the display at a third frame rate during a third time period, wherein the third frame rate is higher than the first frame rate and the second frame rate;
    responsive to determining that the third operational state of the two or more operational states is required, transferring control of the display from the low-power physical processor to the high-power physical processor; and
    animating, using the high-power physical processor, the display.

2. The computer-implemented method of claim 1, wherein:
    the computing device is a smartwatch;
    the high-power physical processor is a processing unit of a system on a chip of the smartwatch;
    the low-power physical processor is a processing unit of a microcontroller unit of the smartwatch;
    the high-power physical processor and the low-power physical processor share a common memory of the smartwatch; and
    the display is an always on display.

3. The computer-implemented method of claim 1, wherein:
    animating the display at the first frame rate during the first time period comprises using the low-power physical processor to present a first animation via the display, the first animation having the first frame rate; and
    animating the display at the second frame rate during the second time period comprises using the low-power physical processor to present a second animation, in response to a clock event, via the display, the second animation having the second frame rate.

4. The computer-implemented method of claim 1, wherein:
    animating the display at the first frame rate during the first time period comprises using the low-power physical processor to present a first portion of an animation via the display, the first portion of the animation having the first frame rate; and
    animating the display at the second frame rate during the second time period comprises using the low-power physical processor to present a second portion of the animation via the display, the second portion of the animation having the second frame rate.

5. The computer-implemented method of claim 1, wherein the first power mode of the low-power physical processor required to animate the display consumes less power than a third power mode of the high-power physical processor required to animate the display, wherein the third power mode corresponds to the third operational state of the two or more operational states.

6. The computer-implemented method of claim 5, wherein the high-power physical processor and the low-power physical processor share a common memory of the computing device and transferring control of the display from the high-power physical processor to the low-power physical processor comprises;
    using the high-power physical processor to write at least a portion of an animation to the shared common memory of the computing device;
    transitioning the high-power physical processor from a higher power mode into a lower power mode; and
    using the low-power physical processor to display at the least the portion of the animation from the shared common memory.

7. The computer-implemented method of claim 1, wherein
    animating the display at the first frame rate during the first time period comprises:
        for one or more of a plurality of frames:
            using the low-power physical processor in the first power mode to present the one or more of the plurality of frames via the display; and
    wherein animating the display at the second frame rate during the second time period comprises, for one or more of an additional plurality of frames:
        using the low-power physical processor in the second power mode to present the one or more of the additional plurality of frames via the display.

8. The computer-implemented method of claim 1, wherein transferring control of the display from the low-power physical processor to the high-power physical processor comprises:
   determining if the low-power physical processor has not finished an animation of the display; and
   using the high-power physical processor to complete the animation of the display when the low-power physical processor has not finished the animation.

9. The computer-implemented method of claim 8, wherein using the high-power physical processor to complete the animation of the display comprises using a transitioning effect to reduce a noticeable difference between a rendering of the animation by the low-power physical processor and a rendering of the animation by the high-power physical processor.

10. The computer-implemented method of claim 1, wherein:
   the first frame rate is within a range of about ten frames per second to thirty frames per second; and
   the second frame rate is within a range of about one frame per minute to one frame per second.

11. A smartwatch comprising:
   an always on display;
   at least one high-power physical processor; and
   at least one low-power physical processor;
   wherein the smartwatch is configured to:
      transfer control of the always on display from the high-power physical processor to the low-power physical processor based on a first operational state of two or more operational states, wherein the first operational state utilizes a first power mode of the low-power physical processor;
      animate, using the low-power physical processor in the first power mode, the display at a first frame rate during a first time period;
      select a second operational state of the two or more operational states utilizing a second power mode of the low-power physical processor, wherein the second power mode required to animate the display consumes less power than the first power mode of the low-power physical processor;
      responsive to selecting the second operational state, animate, using the low-power physical processor in the second power mode, the display at a second frame rate during a second time period;
      determine that a third operational state of the two or more operational states is required for animating the always on display at a third frame rate during a third time period, wherein the third frame rate is higher than the first frame rate and the second frame rate;
      responsive to determining that the third operational state of the two or more operational states is required, transfer control of the display from the low-power physical processor to the high-power physical processor; and
      animate, using the high-power physical processor, the always on display.

12. The smartwatch of claim 11, further comprising:
   a system on a chip, the high-power physical processor being a processing unit of the system on a chip;
   a microcontroller unit separate and distinct from the system on a chip, the low-power physical processor being a processing unit of the microcontroller unit; and
   the high-power physical processor and the low-power physical processor configured to share a common memory of the smartwatch.

13. The smartwatch of claim 11, further comprising one or more sensors, wherein the low-power physical processor is further adapted to record measurements received from the one or more sensors.

14. The smartwatch of claim 11, wherein the low-power state is a sleeping state, and the two or more frame rates are distinct from and lower than the first frame rate and the second frame rate.

15. The smartwatch of claim 11, wherein the smartwatch is further configured to:
   determine that the low-power physical processor has not finished an animation of the always on display in the second operational state; and
   responsive to determining that the low-power physical processor has not finished the animation of the always on display in the second operational state, complete the animation of the always on display using the high-power physical processor in the third operational state.

16. The smartwatch of claim 11, wherein the two or more frame rates comprise at least:
   a third frame rate within a range of about ten frames per second to thirty frames per second; and
   a fourth frame rate within a range of about one frame per minute to one frame per second.

17. The smartwatch of claim 11, wherein the two or more frame rates comprise at least:
   a third frame rate of about ten frames per second; and
   a fourth frame rate of about one frame per twenty seconds.

18. A system comprising:
   a display;
   at least one high-power physical processor;
   at least one low-power physical processor; and
   physical memory storing computer-executable instructions that, when executed by the system, cause the system to:
      transfer control of the display from the high-power physical processor to the low-power physical processor based on a first operational state of two or more operational states, wherein the first operational state utilizes a first power mode of the low-power physical processor;
      animate, using the low-power physical processor in the first power mode, the display at a first frame rate during a first time period;
      select a second operational state of the two or more operational states utilizing a second power mode of the low-power physical processor, wherein the second power mode required to animate the display consumes less power than the first power mode of the low-power physical processor;
      responsive to selecting the second operational state, animate, using the low-power physical processor in the second power mode, the display at a second frame rate during a second time period;
      determine that a third operational state of the two or more operational states is required for animating the display at a third frame rate during a third time period, wherein the third frame rate is higher than the first frame rate and the second frame rate;
      responsive to determining that the third operational state of the two or more operational states is required, transfer control of the display from the low-power physical processor to the high-power physical processor; and
      animate, using the high-power physical processor, the display.

19. The system of claim 18, wherein the display is an always on display and the two or more frame rates comprise at least:
- a third frame rate within a range of about ten frames per second to thirty frames per second; and
- a fourth frame rate within a range of about one frame per minute to one frame per second.

\* \* \* \* \*